United States Patent
Takase

(10) Patent No.: US 9,348,847 B2
(45) Date of Patent: May 24, 2016

(54) DATA ACCESS CONTROL APPARATUS AND DATA ACCESS CONTROL METHOD

(71) Applicant: FUJITSU LIMITED, Kawasaki-shi (JP)

(72) Inventor: Masaaki Takase, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 324 days.

(21) Appl. No.: 13/735,157

(22) Filed: Jan. 7, 2013

(65) Prior Publication Data

US 2013/0226969 A1 Aug. 29, 2013

(30) Foreign Application Priority Data

Feb. 29, 2012 (JP) .................................. 2012-043629

(51) Int. Cl.
*G06F 7/00* (2006.01)
*G06F 17/30* (2006.01)

(52) U.S. Cl.
CPC .... *G06F 17/30283* (2013.01); *G06F 17/30575* (2013.01)

(58) Field of Classification Search
None
See application file for complete search history.

(56) References Cited

U.S. PATENT DOCUMENTS

| | | | | |
|---|---|---|---|---|
| 6,088,803 | A * | 7/2000 | Tso et al. | 726/22 |
| 7,849,502 | B1 * | 12/2010 | Bloch et al. | 726/11 |
| 8,863,286 | B1 * | 10/2014 | Dubrovsky et al. | 726/24 |
| 2002/0067717 | A1 * | 6/2002 | Raschke et al. | 370/386 |
| 2003/0088693 | A1 * | 5/2003 | Cheung et al. | 709/238 |
| 2008/0082662 | A1 * | 4/2008 | Dandliker | H04L 63/10 709/225 |
| 2009/0144284 | A1 * | 6/2009 | Chatley | G06F 3/0613 |
| 2012/0036161 | A1 * | 2/2012 | Lacapra et al. | 707/781 |
| 2012/0246206 | A1 * | 9/2012 | Yamada | H04L 67/1095 707/827 |

FOREIGN PATENT DOCUMENTS

JP 2004-252789 9/2004
JP 2007-200342 8/2007

* cited by examiner

*Primary Examiner* — Tuan A Pham
(74) *Attorney, Agent, or Firm* — Fujitsu Patent Center

(57) ABSTRACT

A data access control apparatus has a management information table in which identification information of a storage node specified as one to which transmission of a reference request is inhibited and a reference condition are associated with each other. When a reference condition and a reference request are received, a transmission processing unit transmits the received reference condition and a reference request to storage nodes except a storage node associated with the received reference condition in the management information table. A registration processing unit determines, based on a response from each storage node to which the reference request has been transmitted, a storage node in which no data matching the received reference condition is stored, and registers identification information of the determined storage node in the management information table in association with the received reference condition.

20 Claims, 23 Drawing Sheets

121 STATE MANAGEMENT TABLE

| SERVER ADDRESS | REFERENCE CONDITION |
|---|---|
| SERVER 2 | vvv |
| SERVER 2 | xxx |
| SERVER 2 | www |

FIG. 8

121 STATE MANAGEMENT TABLE

| SERVER ADDRESS | REFERENCE CONDITION | CONTROL STATE | STATE CHANGE TIME |
|---|---|---|---|
| SERVER 1 | vvv | INHIBITED | |
| SERVER 2 | xxx | ACCUMULATED | T1 |
| SERVER 2 | www | ACCUMULATED | T1 |

FIG. 17

DATA ACCESS CONTROL APPARATUS AND DATA ACCESS CONTROL METHOD

CROSS-REFERENCE TO RELATED APPLICATION

This application is based upon and claims the benefit of priority of the prior Japanese Patent Application No. 2012-043629, filed on Feb. 29, 2012, the entire contents of which are incorporated herein by reference.

FIELD

The embodiments discussed herein are related to a data access control apparatus and a data access control method.

BACKGROUND

In recent years, there has been known a storage system in which data is distributed and stored in a plurality of storage nodes. This storage system includes e.g. a data access control apparatus which collectively receives requests for access to the plurality of storage nodes. When the data access control apparatus receives a request for storing data, the data access control apparatus determines a storage node as a storage destination where the data is to be stored according to a predetermined logic. Then, the data access control apparatus transmits the data to be stored to the determined storage node, and requests the storage node to store the transmitted data. Further, when the data access control apparatus receives a request for referring to data, the data access control apparatus transmits a reference request to a storage node storing the requested data, and transmits the data received in response to the reference request to the apparatus as a sender of the reference request.

As an example of a technique related to the system in which data is distributed and stored, there has been proposed a data retrieval apparatus configured to temporarily store data retrieved from an element database, and output, when a request for searching for the same data is received within a predetermined time after the start of storage of the data, the stored data as a retrieval result without acquiring the data from the element database.

Further, as another example of the same, there has been proposed a data access apparatus configured to add location information of data to an attribute of the data when the data has been retrieved to thereby make it possible to directly access the data without making a query about the location information of the data when referring to the data after the retrieval of the data.

Japanese Laid-Open Patent Publication No. 2004-252789
Japanese Laid-Open Patent Publication No. 2007-200342

Upon receipt of a request for storing data, the above-mentioned data access control apparatus determines a storage destination where the data is to be stored according to a predetermined logic. For example, the data access control apparatus uses e.g. a time stamp of the data or a user ID of a user who has requested to store the data, as a key, and determines a storage destination where the data is to be stored, based on the key.

When the above-mentioned key is specified as a reference condition from an apparatus as a sender of a request for referring to data, the data access control apparatus determines a storage node storing the data requested to be referred to according to the specified key. However, when a reference condition other than the above-mentioned key is specified by an apparatus as a sender of the reference request, the data access control apparatus cannot determine the storage node storing the requested data. In this case, the data access control apparatus sends a reference request for referring to data matching the specified reference condition to all of the storage nodes. In this processing, there is a problem that the data reference request is also sent to storage nodes in which the data matching the reference condition is not stored, which causes wasteful traffic between the data access control apparatus and the storage nodes.

SUMMARY

According to an aspect of the invention, a data access control apparatus that controls access to data stored in a plurality of storage nodes includes a processor configured to perform a procedure including referring, when a reference condition for identifying data to be referred to and a reference request are received, to a management information table which registers management information in which identification information of a storage node specified as one to which transmission of a reference request is inhibited is associated with a reference condition, and transmitting the received reference condition and reference request to ones of the plurality of storage nodes except storage nodes which are associated with the received reference condition in the management information table; and determining, based on a response from each storage node to which the reference request has been transmitted, a storage node in which data matching the received reference condition is not stored, and registering identification information of the determined storage node in the management information table in association with the received reference condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of information registered in a state management table;

FIG. 17 illustrates an example of information registered in the state management table in the third embodiment;

DESCRIPTION OF EMBODIMENTS

Figure 1:
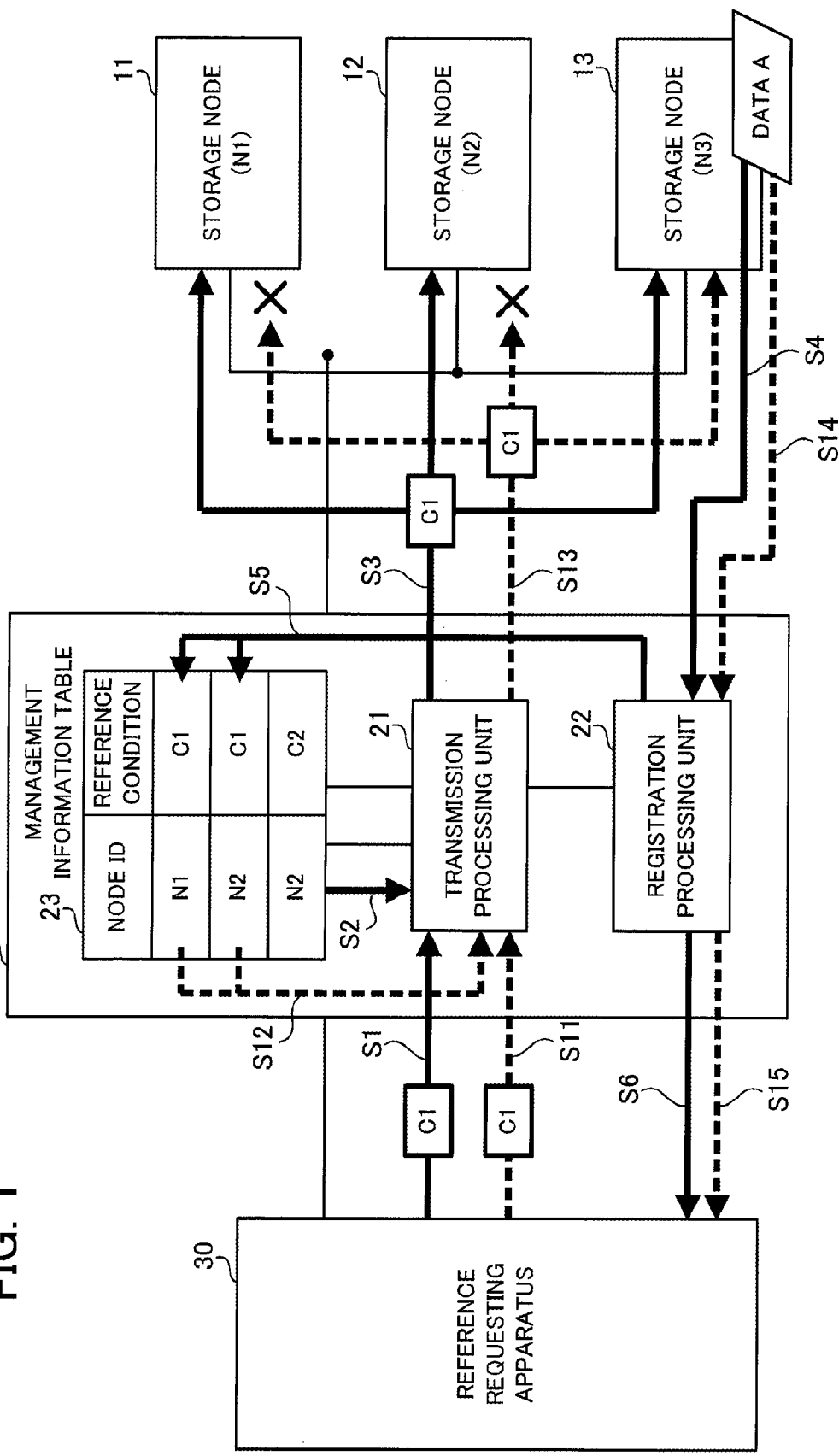
FIG. 1 illustrates an example of the configuration of a storage system according to a first embodiment, and an example of processes executed in the storage system.

Several embodiments will be described below with reference to the accompanying drawings, wherein like reference numerals refer to like elements throughout.

(a) First Embodiment

FIG. 1 illustrates an example of the configuration of a storage system according to a first embodiment, and an example of processes executed in the storage system. The storage system illustrated in FIG. 1 includes a plurality of storage nodes 11 to 13, each of which is capable of storing data, and a data access control apparatus 20.

Each of the storage nodes 11 to 13 reads out data stored in a storage area under the control of the self-apparatus or stores data in the storage area under the control of the self-apparatus, according to a request from the data access control apparatus 20. Each of the storage nodes 11 to 13 is realized e.g. as a data storage server. In the present embodiment, it is assumed that "N1", "N2", are "N3" are assigned to the storage nodes 11, 12, and 13 as identification information (node IDs), respectively.

Further, each of the storage nodes 11 to 13 is capable of retrieving data matching a reference condition notified from the data access control apparatus 20 from the data stored in the storage area under the control of the self-apparatus, and transmitting the retrieved data to the data access control apparatus 20. The reference condition indicates information for identifying data to be referred to. Examples of the reference condition include an attribute of data to be referred to.

The data access control apparatus 20 is an apparatus which collectively controls access to data stored in the storage nodes 11 to 13. For example, when the data access control apparatus 20 receives a request for referring to data from a reference requesting apparatus 30, the data access control apparatus 20 transmits a reference request to a storage node storing the data requested to be referred to. The data access control apparatus 20 transfers the data which has been transmitted from the storage node to which the reference request was transmitted, to the reference requesting apparatus 30.

Note that the number of storage nodes and the number of reference requesting apparatuses, connected to the data access control apparatus 20, can be set as desired.

The data access control apparatus 20 includes a transmission processing unit 21 and a registration processing unit 22. The transmission processing unit 21 and the registration processing unit 22 are configured to be capable of referring to or updating a management information table 23. The management information table 23 is stored e.g. in a storage unit of the data access control apparatus 20.

In the management information table 23, the identification information (node ID) of a storage node specified as one to which transmission of a reference request is to be inhibited and a reference condition are registered, in association with each other.

The reference condition registered in the management information table 23 is a condition having no relation with processing executed by the data access control apparatus 20 for determining a storage location of the data. In other words, in a case where the data access control apparatus 20 receives a reference request from the reference requesting apparatus 30 together with a reference condition registered in the management information table 23, the data access control apparatus 20 cannot determine a storage node storing the data requested to be referred.

When the transmission processing unit 21 receives a reference request and a reference condition from the reference requesting apparatus 30, the transmission processing unit 21 refers to the management information table 23 to determine whether or not the received reference condition is registered in the management information table 23. If the received reference condition is registered in the management information table 23, the transmission processing unit 21 transmits the received reference condition and a reference request to the storage nodes except the storage node associated with the received reference condition in the management information table 23, out of the storage nodes 11 to 13.

The registration processing unit 22 determines, based on a response from each storage node to which the reference request has been sent from the transmission processing unit 21, a storage node in which data matching the reference condition received by the transmission processing unit 21 is not stored. The registration processing unit 22 registers the identification information of the determined storage node in the management information table 23 in association with the reference condition received by the transmission processing unit 21.

An example of processing executed by the transmission processing unit 21 and the registration processing unit 22 will be described hereafter in the order of step numbers.

The reference requesting apparatus 30 transmits a reference condition "C1" and a reference request to the data access control apparatus 20 (step S1). The transmission processing unit 21 determines whether or not the received reference condition "C1" is registered in the management information table 23 (step S2). Assuming that the received reference condition "C1" is not registered in the management information table 23, the transmission processing unit 21 transmits the reference condition "C1" and a reference request to all of the storage nodes 11 to 13 (step S3).

Each of the storage nodes 11 to 13 having received the reference request searches for data matching the reference condition "C1". It is assumed here that the data matching the reference condition "C1" is stored in the storage node 13, but is not stored in the storage nodes 11 and 12. In this case, the storage node 13 sends data A matching the reference condition "C1" to the data access control apparatus 20 as a response to the reference request (step S4). On the other hand, the storage nodes 11 and 12 each send e.g. response information containing no data matching the reference condition "C1" to the data access control apparatus 20 as a response.

The registration processing unit 22 of the data access control apparatus 20 recognizes that the data matching the reference condition "C1" is not stored in the storage nodes 11 and 12 from the fact that the data matching the transmitted reference condition "C1" is received as a response only from the storage node 13. The registration processing unit 22 registers the node IDs of the storage nodes 11 and 12 in the management information table 23 in association with the reference condition "C1" (step S5). Along with this, the registration processing unit 22 transmits the data A received from the storage node 13 to the reference requesting apparatus 30 (step S6).

From this state, assuming by way of example that the reference requesting apparatus 30 transmits the reference condition "C1" and a reference request to the data access control apparatus 20 (step S11). Note that the apparatus as a sender of the reference request may be an apparatus other than the reference requesting apparatus 30.

The transmission processing unit 21 determines whether or not the received reference condition "C1" is registered in the management information table 23 (step S12). At this time, the received reference condition "C1" has been registered in the management information table 23. From this fact, the transmission processing unit 21 does not transmit a reference request to the storage nodes 11 and 12 corresponding to the respective node IDs "N1" and "N2", which are associated with the reference condition "C1" in the management information table 23, but transmits the reference condition "C1" and a reference request only to the other storage node 13 (step S13).

The storage node 13 having received the reference request sends the data A matching the reference condition "C1" to the data access control apparatus 20 as a response to the reference request (step S14). The registration processing unit 22 of the data access control apparatus 20 transmits the data A received from the storage node 13 to the reference requesting apparatus 30 (step S15).

In the above-described process, when receiving the reference condition and the reference request, the transmission processing unit 21 refers to the management information table 23, and inhibits a reference request from being transmitted to a storage node corresponding to a node ID associated with the received reference condition. This prevents the transmission processing unit 21 from transmitting a reference request to a storage node in which data matching the received reference condition is not stored, and hence it is possible to reduce the amount of data transferred between the data access control apparatus 20 and the storage nodes 11 to 13. Further, the number of reference requests transmitted from the transmission processing unit 21 is reduced, which further enables the transmission processing unit 21 to reduce the processing load on the data access control apparatus 20.

Further, in a case where the storage system is configured such that a storage node in which the data matching the reference condition received from the data access control apparatus 20 is not stored sends response information not containing the corresponding data to the data access control apparatus 20 as a response, the number of items of response information sent from the storage nodes to the data access control apparatus 20 is also reduced. This makes it possible to further reduce the amount of data transferred between the data access control apparatus 20 and the storage nodes 11 to 13.

(b) Second Embodiment

Figure 2:
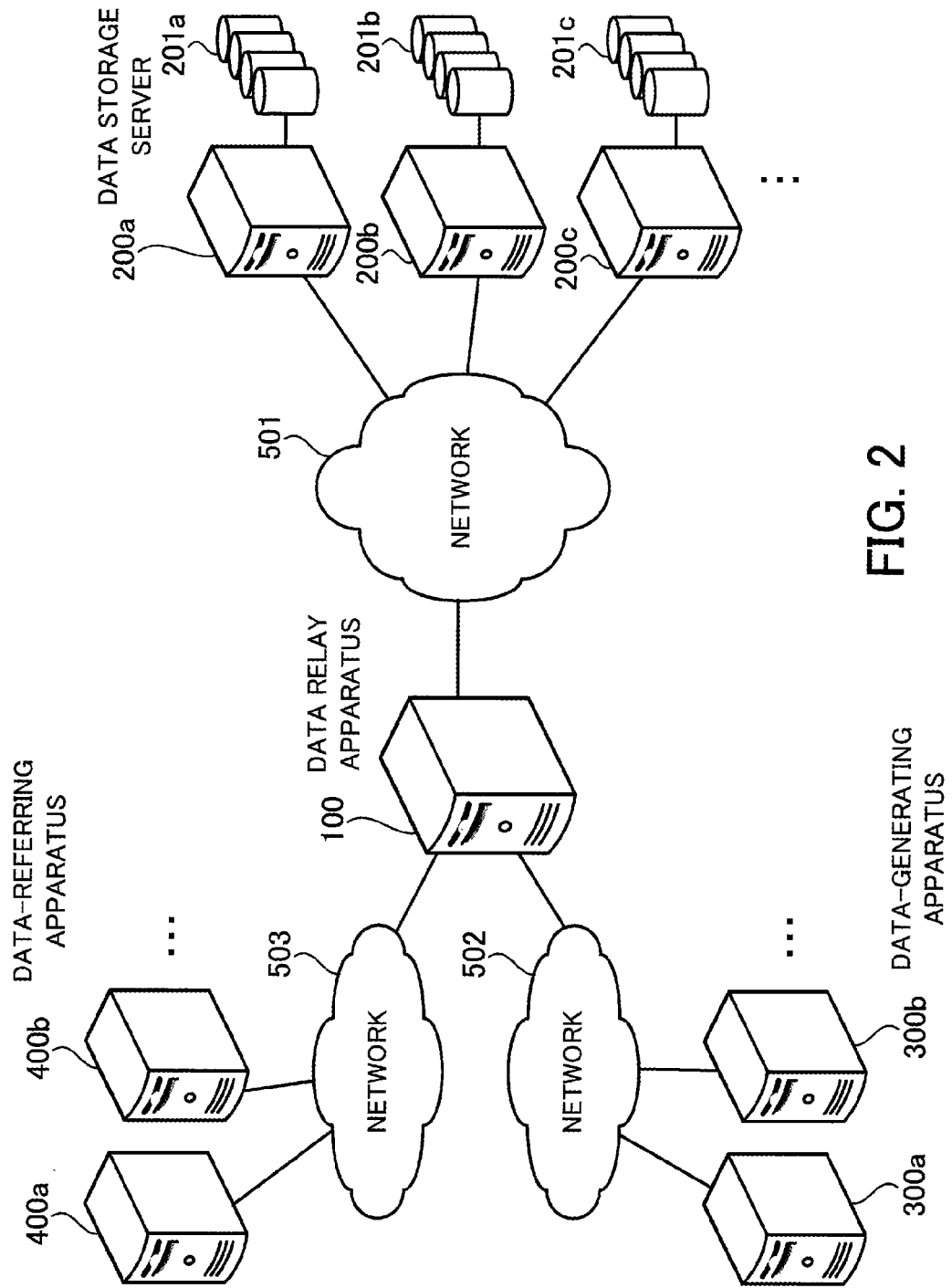
FIG. 2 illustrates an example of the entire arrangement of a storage system according to a second embodiment.

FIG. 2 illustrates an example of the entire arrangement of a storage system according to a second embodiment.

The storage system illustrated in FIG. 2 includes a data relay apparatus 100 and a plurality of data storage servers 200a to 200c. The illustrated storage system is a distributed storage system in which data is distributed and stored in a plurality of storage nodes, and the data storage servers 200a to 200c are each an example of the storage node. Note that although FIG. 2 illustrates three data storage servers 200a to 200c, by way of example, the number of data storage servers can be set as desired.

Storage devices 201a, 201b, and 201c are connected to the data storage servers 200a to 200c, respectively. The data storage server 200a writes and reads data in and from the storage device 201a according to a request from the data relay apparatus 100. The data storage servers 200b and 200c also have the same function as that of the data storage server 200a.

The data relay apparatus 100 is an apparatus for receiving every access request to the data storage servers 200a to 200c. According to a request from a data-generating apparatus for storing data, the data relay apparatus 100 requests one of the data storage servers 200a to 200c to store the data. Further, according to a request from a data-referring apparatus for referring to data, the data relay apparatus 100 acquires the data from one of the data storage servers 200a to 200c, and transmits the acquired data to the data-referring apparatus.

The data-generating apparatuses, denoted by reference numerals 300a and 300b, are each e.g. a terminal apparatus that is operated by a user who requests storage of data. Although in FIG. 2, the two data-generating apparatuses 300a and 300b are illustrated, by way of example, the number of data-generating apparatuses is set as desired.

The data-referring apparatuses, denoted by reference numerals 400a and 400b, are each e.g. a terminal apparatus that is operated by a user who requests reference to data. Although in FIG. 2, the two data-referring apparatuses 400a and 400b are illustrated, by way of example, the number of data-referring apparatuses is set as desired.

Note that the data-generating apparatus and the data-referring apparatus may be constructed as one apparatus. For example, when both of a service for storing data and a service for referring to data are provided, the data relay apparatus 100 and the data storage servers 200b and 200c are apparatuses on the service-provider side, and the data-generating apparatus and the data-referring apparatus are terminal apparatuses used by users who receive the services. In this case, the data-generating apparatus and the data-referring apparatus may be realized as a common terminal apparatus.

In contrast, when only the service for referring to data is provided, the data relay apparatus 100, the data storage servers 200b and 200c and the data-generating apparatus are apparatuses on the service-provider side, and the data-referring apparatus is a terminal apparatus that is used by a user who receives the service. In this case, the data-generating apparatus and the data-referring apparatus are realized as respective separate apparatuses.

In the illustrated example in FIG. 2, the data relay apparatus 100 is connected to the data storage servers 200b and 200c via a network 501. Further, the data relay apparatus 100 is connected to the data-generating apparatuses 300a and 300b via a network 502. Furthermore, the data relay apparatus 100 is connected to the data-referring apparatuses 400a and 400b via a network 503. However, two or all of the networks 501 to 503 may be realized by a common network.

Figure 3:
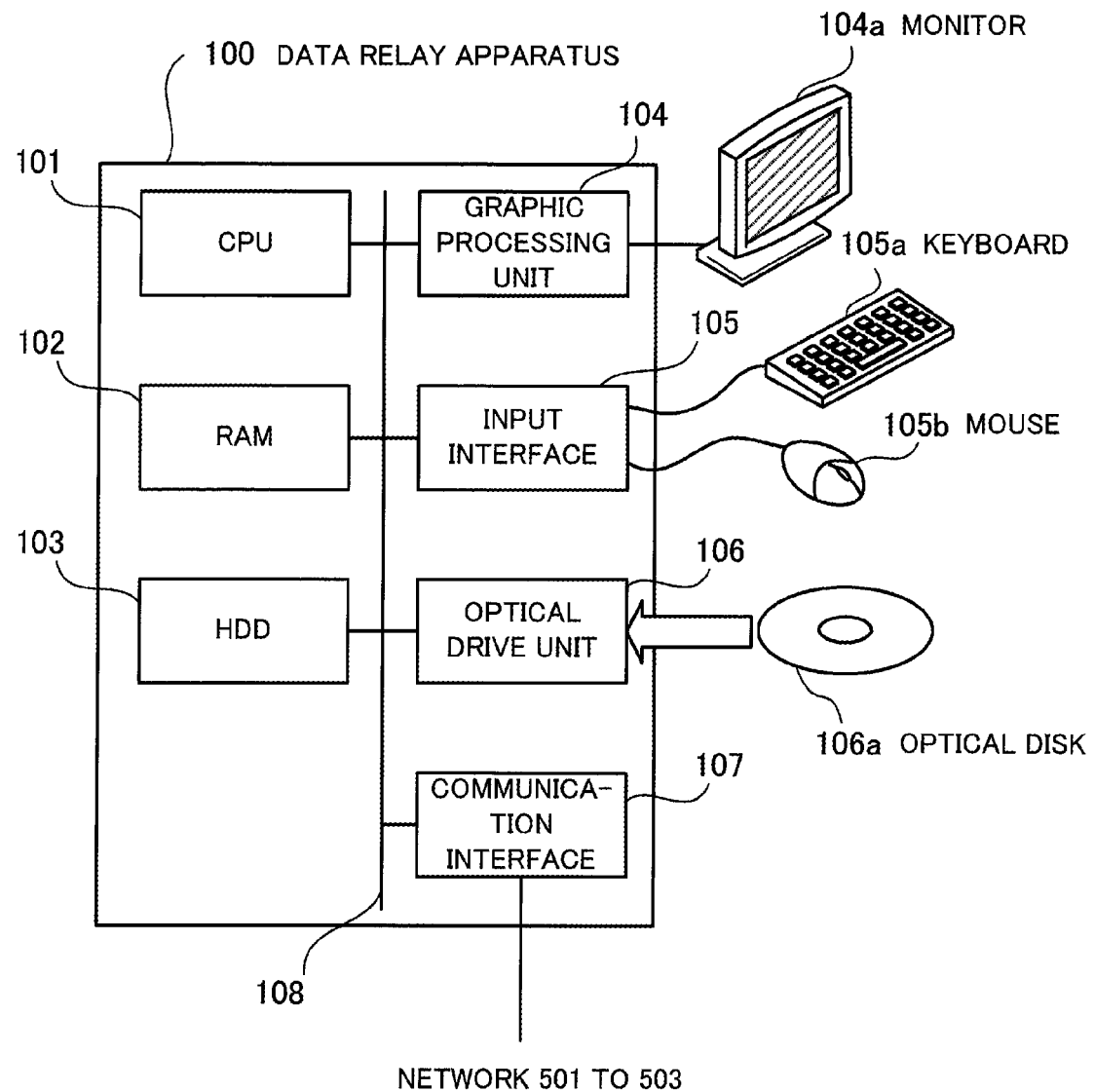
FIG. 3 illustrates an example of the hardware configuration of a data relay apparatus.

FIG. 3 illustrates an example of the hardware configuration of the data relay apparatus.

The data relay apparatus 100 is realized as a computer illustrated in FIG. 3. The entire data relay apparatus 100 is controlled by a CPU (Central Processing Unit) 101. A RAM (Random Access Memory) 102, and a plurality of peripheral devices are connected to the CPU 101 via a bus 108.

The RAM 102 is used as a main storage device of the data relay apparatus 100. The RAM 102 temporarily stores at least part of the program of an OS (Operating System) and application programs which the CPU 101 is caused to execute. Further, the RAM 102 stores various data used by the CPU 101 for processing.

The peripheral devices connected to the bus 108 include an HDD (Hard Disk Drive) 103, a graphic processing unit 104, an input interface 105, an optical drive unit 106, and a communication interface 107.

The HDD 103 magnetically writes and reads data in and from an integrated magnetic disk. The HDD 103 is used as a secondary storage device of the data relay apparatus 100. The HDD 103 stores the program of the OS, the application programs, and various data. Note that a nonvolatile storage device of the other type, such as a flash memory, may be used as a secondary storage device.

A monitor 104a is connected to the graphic processing unit 104. The graphic processing unit 104 displays images on the monitor 104a according to commands from the CPU 101. The monitor 104a is a liquid crystal display, for example.

Input devices, such as a keyboard 105a and a mouse 105b, are connected to the input interface 105. The input interface 105 transmits signals delivered from the input devices to the CPU 101.

The optical drive unit 106 reads data recorded on an optical disk 106a using e.g. laser light. The optical disk 106a is a portable storage medium in which data is recorded in a manner readable by reflection of light. Examples of the optical disk 106a include a DVD (Digital Versatile Disc), a DVD-RAM, a CD-ROM (Compact Disc Read Only Memory), a CD-R (Recordable)/RW (ReWritable).

The communication interface 107 exchanges data with the other apparatuses via the networks 501 to 503.

With the hardware configuration described as above, it is possible to realize the data relay apparatus 100 according to the present embodiment. Note that it is also possible to realize each of the data storage servers 200a to 200c, the data-generating apparatuses 300a and 300b, the data-referring apparatuses 400a and 400b, as such a computer as illustrated in FIG. 3.

Next, an example of messages transmitted and received by the data relay apparatus 100 is illustrated, and the basic operation of the data relay apparatus 100 will be described.

Figure 4:
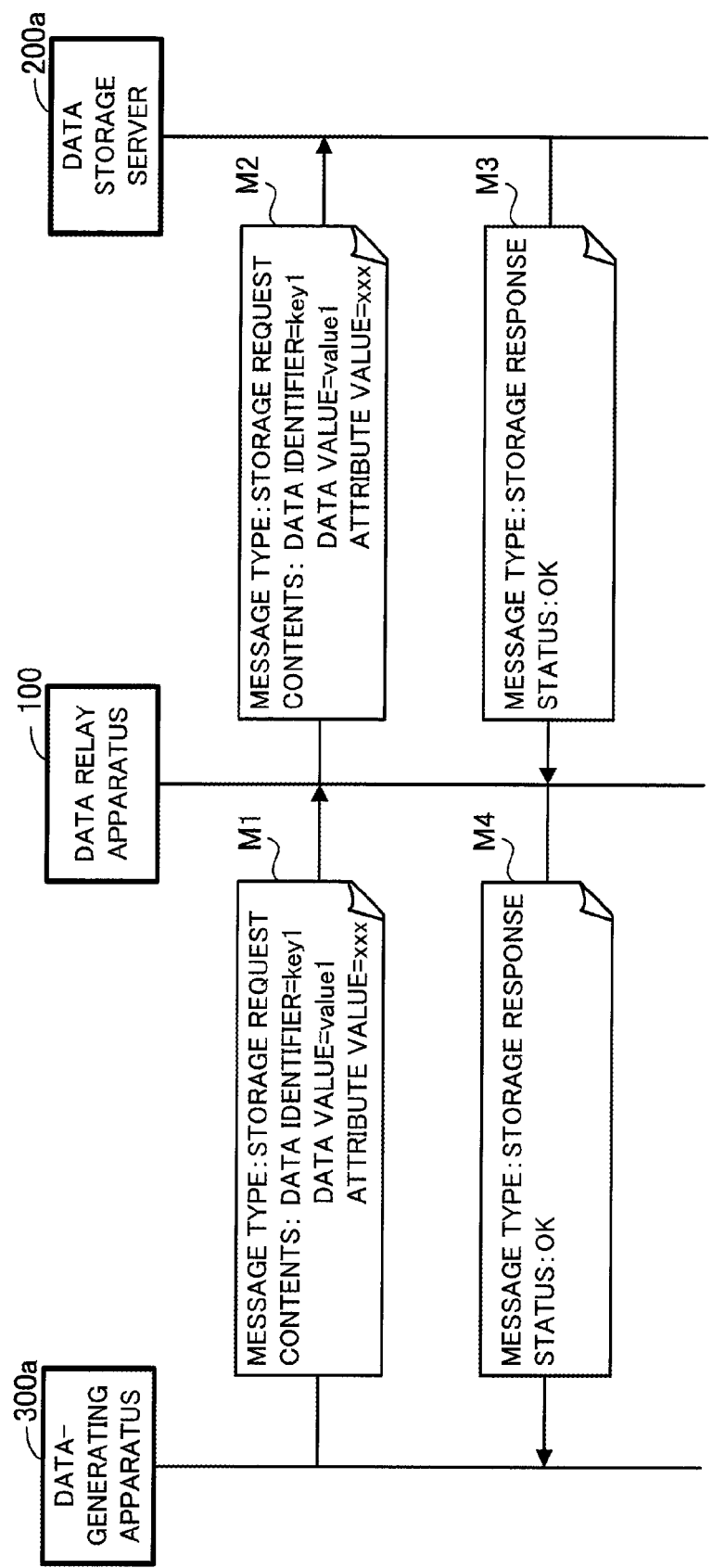
FIG. 4 illustrates an example of messages transferred when storing the contents and a flow of transferring the messages.

FIG. 4 illustrates an example of messages transferred when storing the contents and a flow of transferring the messages.

The data storage servers 200a to 200c each store a "data value" as the entity of data in a storage device with a "data identifier". The data identifier is a label randomly set to data, and a user ID or a time stamp is used, for example. Further, a predetermined attribute value is added to the data value. Hereinafter, the combination of a data identifier, a data value, and an attribute value is referred to as "contents".

The data relay apparatus 100 determines, based on the data identifier transmitted from the data-generating apparatus with the data value, a data storage server as a storage destination where the contents are to be stored. The storage destination where the contents are to be stored is determined e.g. by a predetermined calculation, such as calculation of a hash value based on the data identifier, or by a method in which a data storage server which has a sufficient remaining capacity for data storage is set as the storage destination where the contents are to be stored, and the storage destination and the data identifier are managed using a table.

In FIG. 4, for example, when the data-generating apparatus 300a requests storage of data, the data-generating apparatus 300a transmits a storage request message M1 to the data relay apparatus 100. The storage request message M1 includes items of "message type" and "contents", and "storage request" is set in the item of the message type. In the item of the contents, information on the contents, i.e. the data identifier, the data value, and the attribute value of the data value are set. In the example illustrated in FIG. 4, the data identifier is "key 1", the data value is "value 1", and the attribute value is "xxx".

The data relay apparatus 100 extracts the data identifier "key 1" from the received storage request message M1, and determines, based on the extracted data identifier "key 1", a storage destination where the data value "value 1" is to be stored. Assuming that the storage destination is determined to be the data storage server 200a, the data relay apparatus 100 transmits a storage request message M2 containing information set in the items of the message type and the contents in the received storage request message M1 to the data storage server 200a.

The data storage server 200a having received the storage request message M2 stores a pair of the data identifier "key 1" and the data value "value 1" in the storage device 201a, and then sends a storage response message M3 as a response. The storage response message M3 includes items of "message type" and "status", and "storage response" is set in the item of the message type. In the item of the status, "OK" is set if the storage of the contents has normally been completed, and "NG" is set if the storage of the contents has not been normally completed.

The data relay apparatus 100 transmits a storage response message M4 containing information set in the items of the message type and the status of the received storage response message M3 to the data-generating apparatus 300a.

Although not illustrated, when deletion of the contents is requested, the following operation is performed:

When requesting deletion of the contents, the data-generating apparatus 300a transmits a deletion request message to the data relay apparatus 100. In the deletion request message, "deletion request" is set in the item of the message type, and only data identifier is set in the item of the contents. The data relay apparatus 100 determines a data storage server storing the corresponding contents based on the data identifier set in the deletion request message. The data relay apparatus 100 transmits a deletion request message containing information set in the items of the message type and the contents of the received deletion request message to the determined data storage server.

The data storage server deletes the contents including the data identifier set in the received deletion request message from the storage device connected thereto. The data storage server transmits a deletion response message in which "deletion response" is set in the item of the message type to the data relay apparatus 100. The deletion response message includes an item of "status", and "OK" is set in the item of the status if deletion of the contents have been normally completed, and "NG" is set in the same if deletion of the contents have not been normally completed. The data relay apparatus 100 transmits a deletion response message containing information set in the items of the message type and the status of the received deletion response message to the data-generating apparatus 300a.

Figure 5:
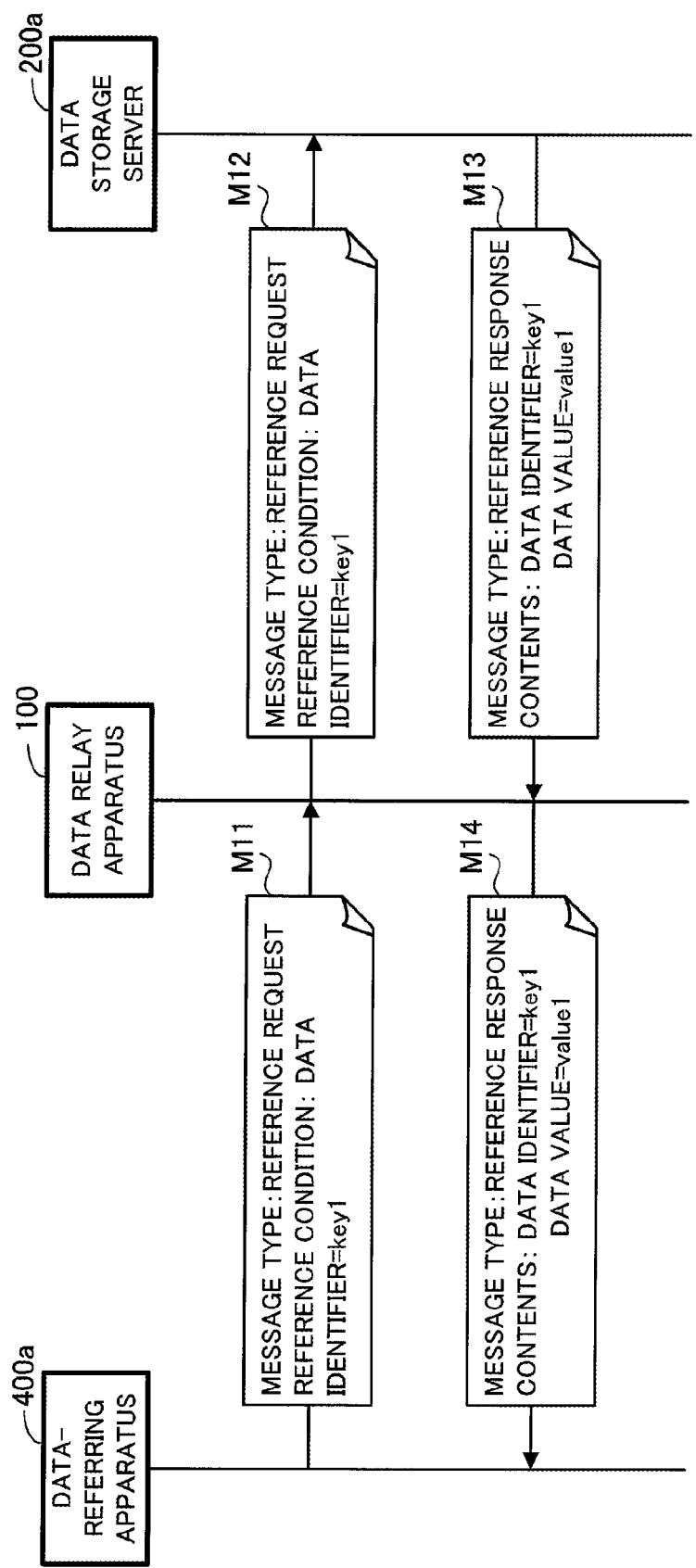
FIG. 5 is a first diagram illustrating an example of messages transferred when referring to the contents and a flow of transferring the messages.

FIG. 5 is a first diagram illustrating an example of messages transferred when referring to the contents and a flow of transfer of the messages. By having data identifier specified as a reference condition from the data-referring apparatus, the data relay apparatus 100 determines which data storage server stores a data value associated with the specified data identifier.

In FIG. 5, for example, when the data-referring apparatus 400a requests the data relay apparatus 100 to refer to data by specifying the data identifier "key 1", the data-referring apparatus 400a transmits a reference request message M11 to the data relay apparatus 100. The reference request message M11 includes items of "message type" and "reference condition", and "reference request" is set in the item of the message type. Further, in this example, the data identifier "key 1" is set in the item of the reference condition.

The data relay apparatus 100 extracts the data identifier "key 1" from the received reference request message M11, and identifies, based on the extracted data identifier "key 1", a data storage server storing the data value requested to be referred to. Assuming that the data storage server 200a is identified as the storage server storing the data value, the data relay apparatus 100 transmits a reference request message M12 containing information set in the items of the message type and the reference condition of the received reference request message M11 to the data storage server 200a.

The data storage server 200a having received the reference request message M12 reads out the data value "value 1" associated with the data identifier "key 1" from the storage device 201a, and sends a reference response message M13 as a response. The reference response message M13 includes items of "message type" and "contents", and "reference response" is set in the item of the message type. In the item of the contents, the data value "value 1" read out from the storage device 201a is set together with the specified data identifier "key 1".

The data relay apparatus 100 transmits a reference response message M14 containing the information set in the items of the message type and the contents of the received reference response message M13 to the data-referring apparatus 400a.

Note that in the reference response messages M13 and M14, the attribute value of the data value may be added to the item of the contents.

As described above, the data relay apparatus 100 determines a location where the data requested to be referred to is stored by receiving a specified data identifier from the data-referring apparatus as a reference condition. However, the data relay apparatus 100 does not always receive a reference request specifying a data identifier. For example, not all data-referring apparatuses recognize the data identifier which makes it possible to determine a data storage location, and hence a data-referring apparatus which does not recognize the data identifier sometimes transmits a reference request specifying a reference condition other than the data identifier.

Figure 6:
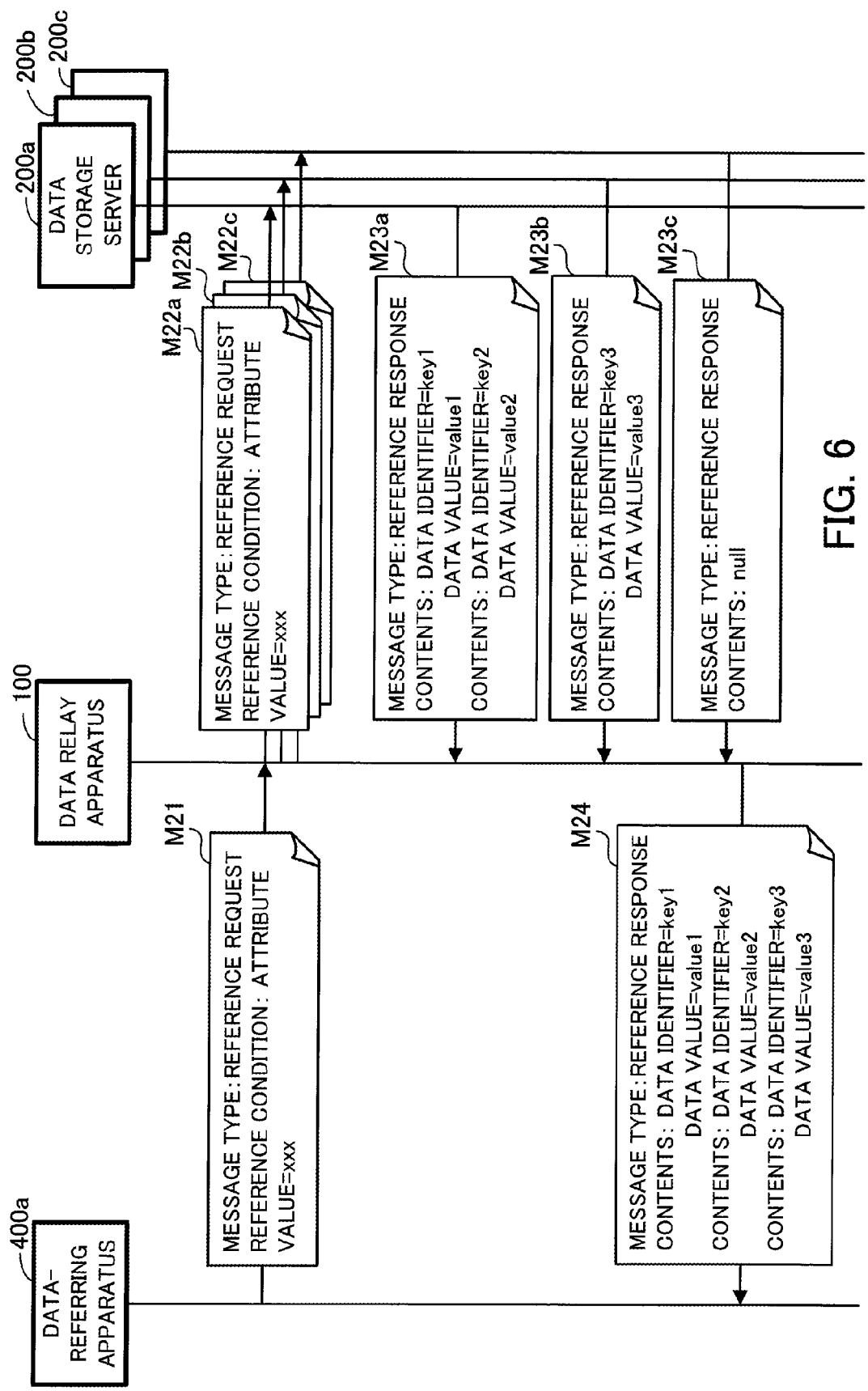
FIG. 6 is a second diagram illustrating an example of messages transferred when referring to contents and a flow of transferring the messages.

Hereafter, the data referring process in a case where an attribute of a data value is specified as a reference condition other than the data identifier will be described with reference to FIG. 6. FIG. 6 is a second diagram illustrating an example of messages transferred when referring to the contents and a flow of transfer of the messages.

When transmitting a reference request specifying an attribute of a data value as a reference condition, the data-referring apparatus 400a transmits a reference request message M21 to the data relay apparatus 100. In the reference request message M21, "reference request" is set in the item of the message type thereof. However, in the item of the reference condition, instead of the data identifier, an attribute value of the data value requested to be referred to is set. In the illustrated example in FIG. 6, the attribute value "xxx" is set in the reference request message M21 as a reference condition.

The data relay apparatus 100 having received the reference request message M21 cannot identify a storage location of the data value requested to be referred to, and hence the data relay apparatus 100 transmits reference request messages M22a to M22c to all of the data storage servers 200a to 200c, respectively. In each of the reference request messages M22a to M22c, information set in the items of the message type and the reference condition in the reference request message M21 is set.

The data storage servers 200a to 200c each have a function, when an attribute value is specified as a reference condition, of searching the storage device connected to the self-apparatus for the contents matching the specified attribute value. storage server 200a having received the reference request message M22a reads out the contents including the data identifier "key 1" and the data value "value 1" and the contents including the data identifier "key 2" and the data value "value 2" from the storage device 201a as the contents matching the specified attribute value "xxx". The data storage server 200a sends a reference response message M23a in which the contents including the data identifier "key 1" and the data value "value 1" and the contents including the data identifier "key 2" and the data value "value 2" are set, to the data relay apparatus 100 as a response.

Further, in the illustrated example in FIG. 6, the data storage server 200b having received a reference request message M22b reads out the contents including the data identifier "key 3" and the data value "value 3" from the storage device 201b as the contents matching the specified attribute value "xxx". The data storage server 200b sends a reference response message M23b in which the contents including the data identifier "key 3" and the data value "value 3" are set, to the data relay apparatus 100 as a response.

On the other hand, it is assumed that in the illustrated example in FIG. 6, the contents matching the specified attribute value "xxx" are not stored in the storage device 201c connected to the data storage server 200c. In this case, the data storage server 200c sends a reference response message M23c in which "null" indicating that no corresponding contents exist is set in the item of the contents, to the data relay apparatus 100 as a response. In the present embodiment, it is assumed that "null" indicates that all values are equal to "0".

The data relay apparatus 100 generates a reference response message M24 in which the read contents are merged based on the received reference response messages M23a to M23c, and transmits the generated reference response message M24 to the data-referring apparatus 400a. In the reference response message M24, the contents including the data identifier "key 1" and the data value "value 1", the contents including the data identifier "key 2" and the data value "value 2", and the contents including the data identifier "key 3" and the data value "value 3" are set.

By the way, as described with reference to FIG. 6, when an attribute value is specified as a reference condition, since the data relay apparatus 100 cannot determine a storage location of the contents requested to be referred to, the data relay apparatus 100 transmits the reference request message to all of the data storage servers 200a to 200c, respectively. In this process, the reference request message is also transmitted to the data storage server 200c which does not store the corresponding contents, which generates extra traffic on the network 501. Further, the data storage server 200c transmits the reference response message in which the contents are not set as a response, which generates further extra traffic on the network 501.

The data relay apparatus 100 according to the present embodiment has a function of preventing such wasteful exchange of messages as mentioned above from being executed as much as possible. With this function, the data relay apparatus 100 reduces the amount of data transferred over the network 501 in the case where a data reference request specifying an attribute value as a reference condition is received.

Figure 7:
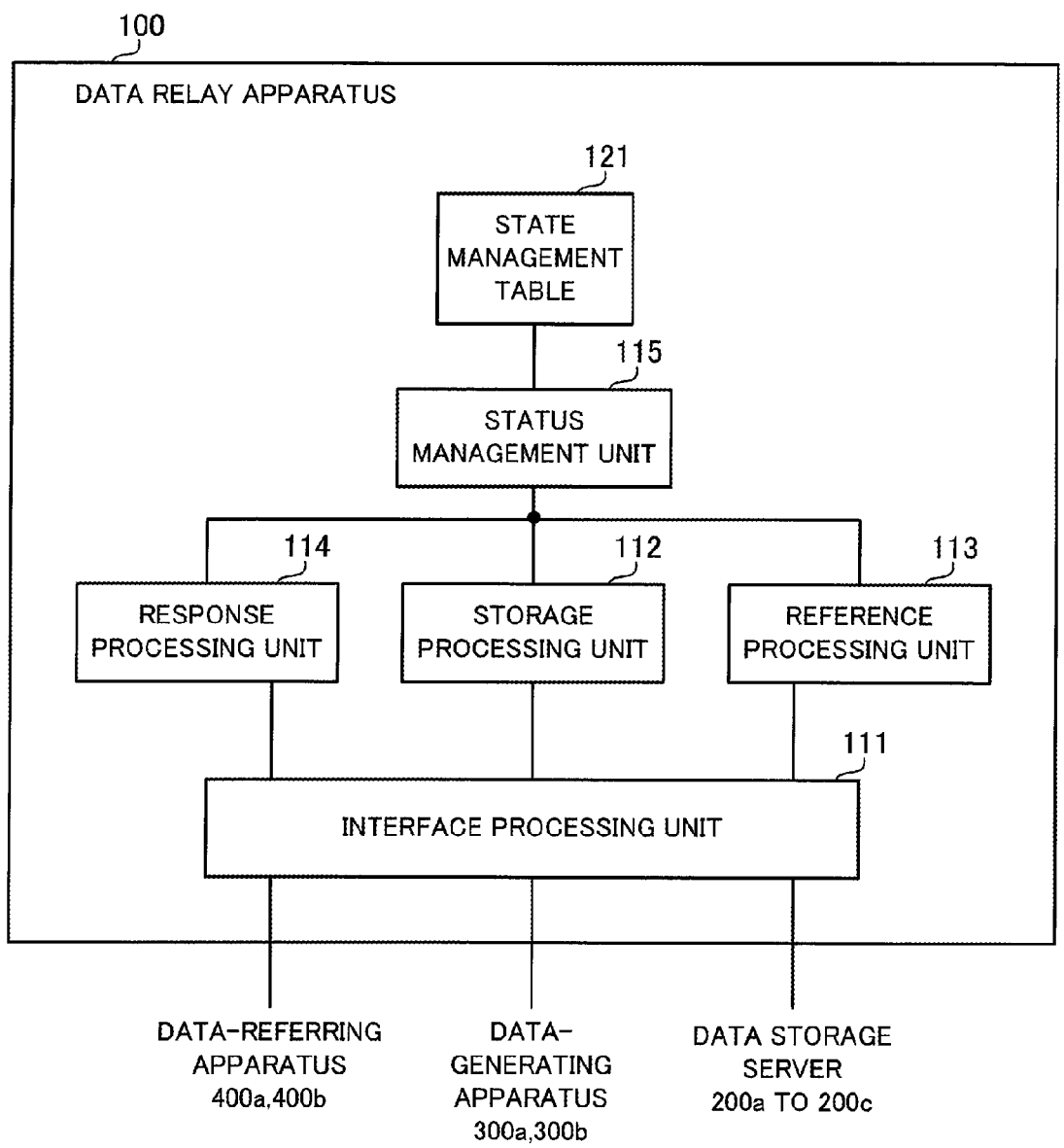
FIG. 7 is a block diagram of an example of the configuration of functions equipped in the data relay apparatus according to the second embodiment.

FIG. 7 is a block diagram of an example of the configuration of functions equipped in the data relay apparatus according to the second embodiment.

The data relay apparatus 100 includes an interface processing unit 111, a storage processing unit 112, a reference processing unit 113, a response processing unit 114, and a status management unit 115. Processes executed by the interface processing unit 111, the storage processing unit 112, the reference processing unit 113, the response processing unit 114, and the status management unit 115 are realized e.g. by executing predetermined programs by the CPU included in the data relay apparatus 100. Further, in the storage unit (e.g. the RAM 102) of the data relay apparatus 100, a state management table 121 is stored.

The interface processing unit 111 exchanges messages with the other apparatuses (i.e. the data storage servers 200a to 200c, the data-generating apparatuses 300a and 300b, and the data-referring apparatuses 400a and 400b). The interface processing unit 111 allocates a message received from another apparatus (any of the other apparatuses) to the storage processing unit 112, the reference processing unit 113, or the response processing unit 114, for example. Further, the interface processing unit 111 transmits a message to another apparatus according to an instruction from the storage processing unit 112, the reference processing unit 113, or the response processing unit 114.

The storage processing unit 112 executes a process for requesting a data storage server to store the contents according to a storage request from a data-generating apparatus. Further, the storage processing unit 112 executes a process for deleting the contents stored in a data storage server according to a deletion request from a data-generating apparatus.

The reference processing unit 113 executes a process for referring to the contents stored in a data storage server according to a reference request from a data-referring apparatus.

The response processing unit 114 executes a process according to a response message transmitted from a data storage server.

The status management unit 115 performs registration of information in the state management table 121, and reading of information from the state management table 121. The storage processing unit 112, the reference processing unit 113, and the response processing unit 114 are capable of registering information in the state management table 121 and reading out information from the same via the status management unit 115.

FIG. 8 illustrates an example of information registered in the state management table.

In the state management table 121, a record including items of "server address" and "reference condition" is registered. In the item of the server address, a value for identifying a location of a data storage server is registered. In the item of the reference condition, an attribute value specified as a reference condition from a data-referring apparatus is registered.

The state management table 121 is table information for managing data storage servers to which transmission of reference requests is inhibited, in association with reference conditions. A combination of a server address and a reference condition registered in one record in the state management table 121 is set in a control state in which transmission of a reference request is inhibited. When an attribute value is specified as a reference condition, if the specified attribute value has been registered in the state management table 121, the reference processing unit 113 of the data relay apparatus 100 inhibits a reference request from being transmitted to a data storage server which is associated with the specified attribute value.

The control state in which transmission of a reference request is inhibited is hereinafter referred to as the "inhibited state". On the other hand, the control state with respect to a combination of a server address and a reference condition which has not been registered in the state management table 121 is referred to as the "non-inhibited state".

Next, an example of the processes executed in the storage system according to the present embodiment will be described with reference to respective sequence diagrams. In the following sequence diagrams, it is assumed that the two data storage servers 200a and 200b are connected to the data relay apparatus 100 so as to simplify the description.

Figure 9:
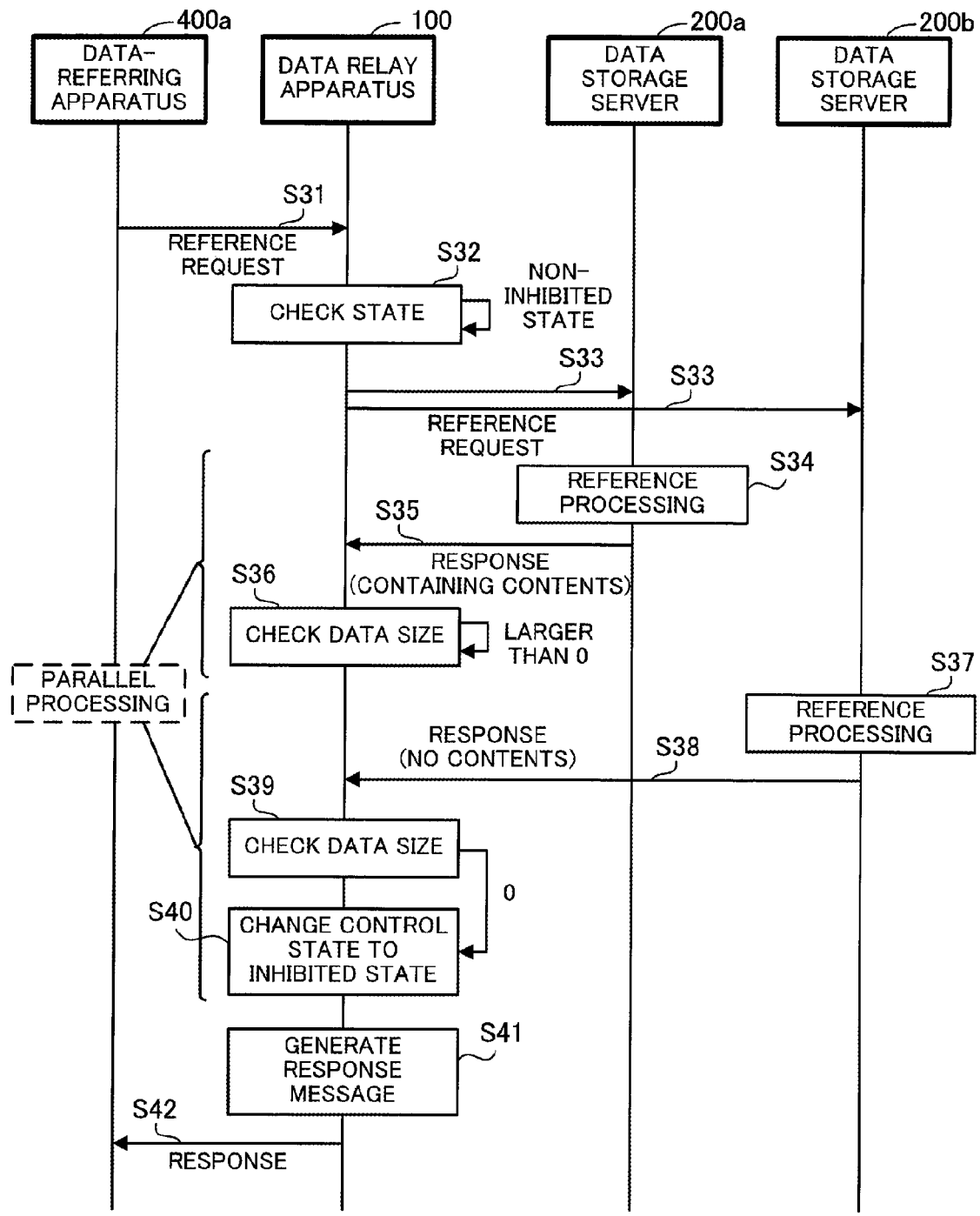
FIG. 9 is a first sequence diagram of an example of a process for referring to contents matching an attribute value.

FIG. 9 is a first sequence diagram of an example of a process for referring to the contents matching an attribute value. FIG. 9 illustrates an example of a process executed in a case where no data storage server is set to the inhibited state.

First, the data-referring apparatus 400a transmits a reference request message specifying e.g. the attribute value "xxx" as a reference condition to the data relay apparatus 100 (step S31). The data relay apparatus 100 refers to the state management table 121 to check the control state (step S32). More specifically, the data relay apparatus 100 determines whether or not the specified attribute value "xxx" is registered in the state management table 121.

In the present process, it is assumed that the attribute value "xxx" is not registered in the state management table 121, and the data storage servers 200a and 200b are both in the non-inhibited state. In this case, the data relay apparatus 100 transmits a reference request message specifying the attribute value "xxx" as a reference condition to the data storage servers 200a and 200b, respectively (step S33). That is, the data relay apparatus 100 transmits the reference request message to all of the data storage servers connected thereto, because it is not possible to determine a storage location of the contents matching the attribute value "xxx" specified by the data-referring apparatus 400a.

In the present process, it is assumed that the contents matching the attribute value "xxx" are stored in the storage device 201a connected to the data storage server 200a, but are not stored in the storage device 201b connected to the data storage server 200b.

In this case, the data storage server 200a searches the storage device 201a for the contents matching the attribute value "xxx" (step S34). The data storage server 200a reads out the contents matching the attribute value "xxx" from the storage device 201a, and transmits a reference response message containing the read contents to the data relay apparatus 100 (step S35).

The data relay apparatus 100 checks the data size of the item of the contents in the reference response message received from the data storage server 200a (step S36). In this step, the data relay apparatus 100 determines that the data size of the item of the contents is larger than 0, and hence the contents are stored in this item. In this case, the data relay apparatus 100 performs no registration processing for the state management table 121.

On the other hand, the data storage server 200b also searches the storage device 201b for the contents matching the attribute value "xxx" (step S37). However, the data storage server 200b cannot read out the contents matching the attribute value "xxx" from the storage device 201b, and transmits a reference response message containing none of the contents to the data relay apparatus 100 (step S38).

The data relay apparatus 100 checks the data size of the item of the contents in the reference response message received from the data storage server 200b (step S39). In this step, the data relay apparatus 100 determines that the data size of the item of the contents is equal to 0, and the contents are not stored in this item.

In this case, the data relay apparatus 100 changes the control state of a combination of the data storage server 200b and the attribute value "xxx" to the inhibited state (step S40). More specifically, the data relay apparatus 100 registers a record in which "server 2" indicative of the server address of the data storage server 200b is associated with the attribute value "xxx" as a reference condition in the state management table 121 as indicated by the second top record in the state management table 121 illustrated in FIG. 8.

Note that the response processing operations by the data storage servers 200a and 200b are executed in parallel. Therefore, the steps S34 to S36 and the steps S37 to S40 in FIG. 9 are executed in parallel.

The data relay apparatus 100 merges the received contents to create a reference response message (step S41). In this example, the data relay apparatus 100 generates the reference response message containing the contents received from the data storage server 200a, and transmits the generated response message to the data-referring apparatus 400a (step S42).

Figure 10:
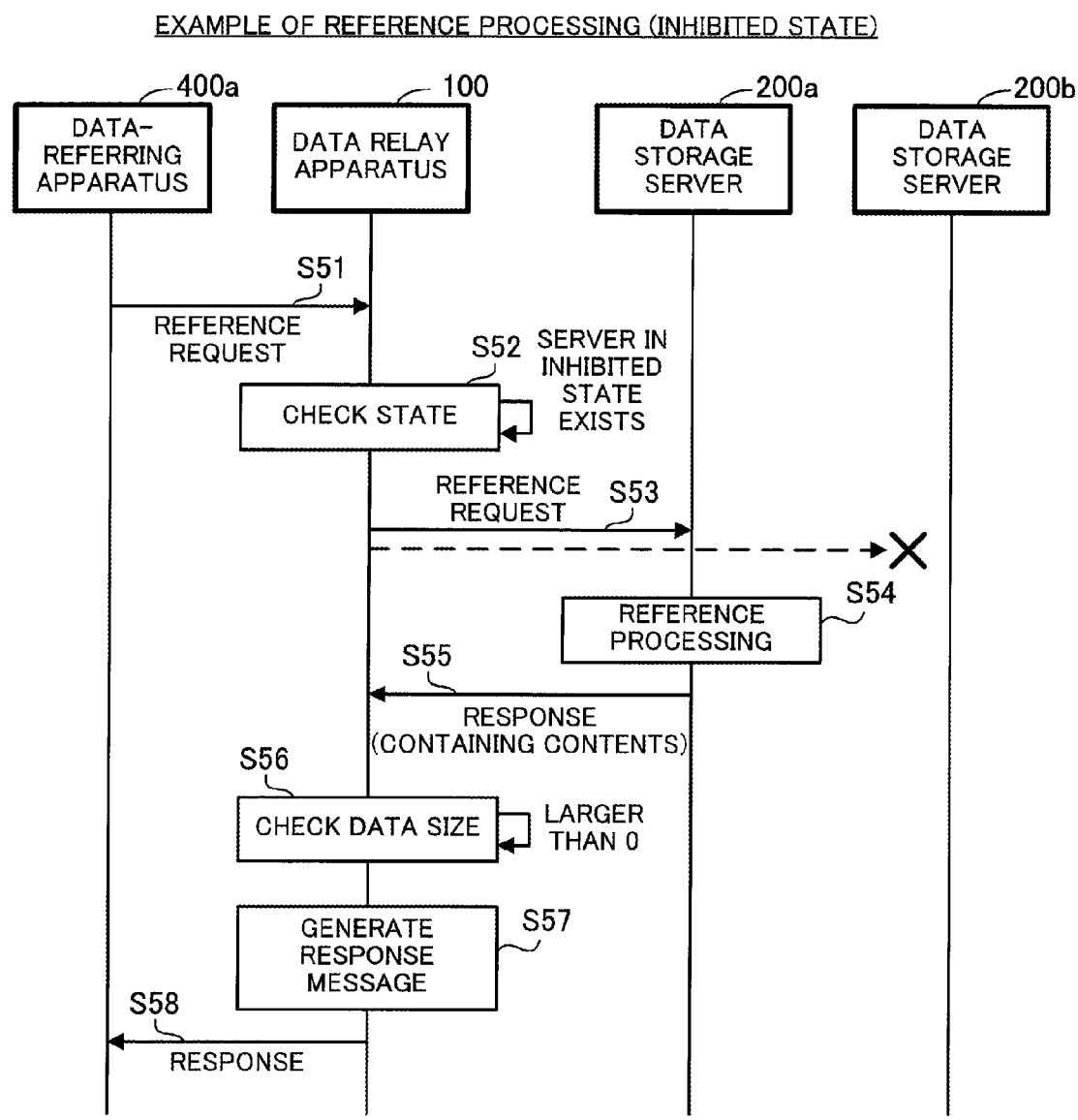
FIG. 10 is a second sequence diagram of an example of the process for referring to contents matching an attribute value.

Next, FIG. 10 is a second sequence diagram of an example of the process for referring to the contents matching an attribute value. FIG. 10 illustrates an example of the process executed in a case where a reference request specifying the same attribute value "xxx" is sent again from the data-referring apparatus 400a after execution of the above-described process in FIG. 9.

The data-referring apparatus 400a transmits a reference request message specifying the attribute value "xxx" as a reference condition to the data relay apparatus 100 (step S51). The data relay apparatus 100 refers to the state management table 121 to check the control states (step S52). In this example, the data relay apparatus 100 extracts the record including the attribute value "xxx" and the server address "server 2" of the data storage server 200b from the state management table 121, and determines that the data storage server 200b is in the inhibited state.

The data relay apparatus 100 transmits a reference request specifying the attribute value "xxx" as a reference condition to the other data storage server except the data storage server 200b in the inhibited state (i.e. the data storage server 200a) (step S53). At this time, the reference request is not transmitted to the data storage server 200b in the inhibited state.

The data storage server 200a searches the storage device 201a for the contents matching the attribute value "xxx" (step S54), and reads out the contents matching the attribute value "xxx" from the storage device 201a. The data storage server 200a transmits a reference response message containing the read contents to the data relay apparatus 100 (step S55).

The data relay apparatus 100 checks the data size of the item of the contents in the reference response message received from the data storage server 200a (step S56). In this step, the data relay apparatus 100 determines that the data size of the item of the contents is larger than 0, and the contents are stored in this item, and hence the data relay apparatus 100 performs no registration processing for the state management table 121.

The data relay apparatus 100 generates a reference response message containing the contents received from the data storage server 200a (step S57), and transmits the generated reference response message to the data-referring apparatus 400a (step S58).

According to the above-described process in FIG. 10, differently from the process in FIG. 9, the data relay apparatus 100 does not transmit the reference request to the data storage server 200b in which the contents matching the attribute value "xxx" are not stored. As a consequence, a wasteful reference response message not containing the contents is not transmitted from the data storage server 200b, either. Therefore, it is possible to reduce the amount of data transferred over the network 501.

Figure 11:
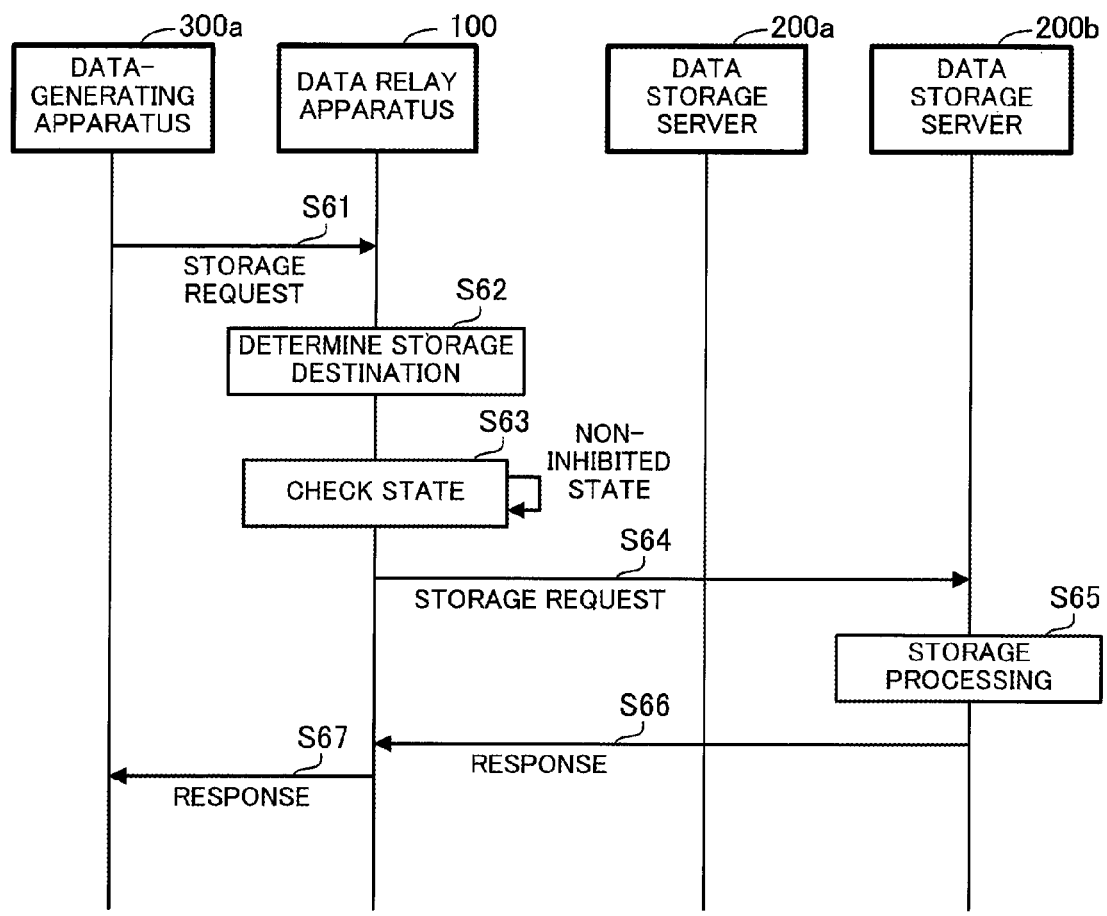
FIG. 11 is a first sequence diagram of an example of a process for storing contents.

Next, FIG. 11 is a first sequence diagram of an example of a process for storing the contents. FIG. 11 illustrates an example of the process executed in a case where a storage destination where the contents are to be stored is in the non-inhibited state.

First, the data-generating apparatus 300a transmits a storage request message specifying e.g. the data identifier "key 2", the data value "value 2", and the attribute value "xxx" to the data relay apparatus 100 (step S61). The data relay apparatus 100 determines, based on the data identifier "key 2", a storage destination where the contents are to be stored (step S62). In this step, it is assumed that the data relay apparatus 100 determines that the data storage server 200b is a storage destination where the contents are to be stored.

The data relay apparatus 100 refers to the state management table 121 to check the control state of the data storage server 200b (step S63). More specifically, the data relay apparatus 100 determines whether or not the server address of the data storage server 200b set as the storage destination is registered in the state management table 121.

In the present process, it is assumed that the server address of the data storage server 200b is not registered in the state management table 121, and the data storage server 200b is in the non-inhibited state. In this case, the data relay apparatus 100 transmits a storage request message to the data storage server 200b, in which the data identifier "key 2", the data value "value 2", and the attribute value "xxx" are set (step S64).

The data storage server 200b having received the storage request message stores the contents including the data identifier "key 2", the data value "value 2", and the attribute value "xxx" in a predetermined area of the storage device 201b (step S65). The data storage server 200b transmits a storage response message indicating that the storage processing has been normally completed, to the data relay apparatus 100 (step S66). The data relay apparatus 100 transmits a storage response message indicating that the storage processing has been normally completed to the data-generating apparatus 300a (step S67).

Figure 12:
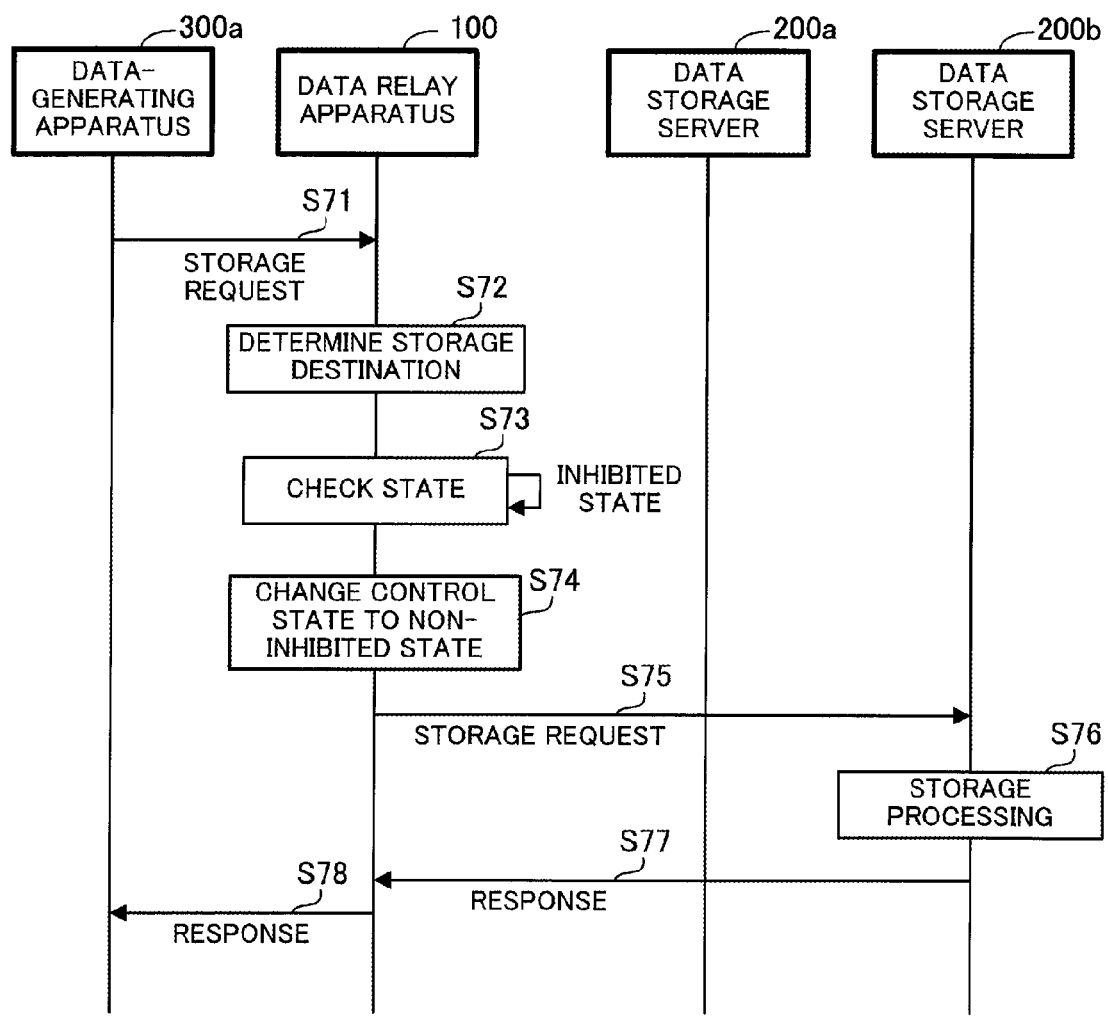
FIG. 12 is a second sequence diagram of an example of the process for storing contents.

FIG. 12 is a second sequence diagram of an example of the process for storing the contents. FIG. 12 illustrates an example of the process executed in a case where a storage destination where the contents are to be stored is in the inhibited state.

The data-generating apparatus 300a transmits a storage request message in which the data identifier "key 2", the data value "value 2", and the attribute value "xxx" are set, to the data relay apparatus 100 (step S71). The data relay apparatus 100 determined, based on the data identifier "key 2", that the data storage server 200b, for example, is a storage destination where the contents are to be stored (step S72).

The data relay apparatus 100 refers to the state management table 121 to check the control state of the data storage server 200b (step S73). More specifically, the data relay apparatus 100 determines whether or not the server address of the data storage server 200b set as the storage destination is registered in the state management table 121.

It is assumed here that the server address of the data storage server 200b is registered in the state management table 121, and the data storage server 200b is in the inhibited state. In this case, the data relay apparatus 100 changes the control state of the data storage server 200b to the non-inhibited state (step S74).

More specifically, the data relay apparatus 100 deletes all records each including the server address of the data storage server 200b from the state management table 121. For example, as illustrated in FIG. 8, if three records each including "server 2" indicative of the data storage server 200b are registered in the state management table 121, the data relay apparatus 100 deletes these three records.

In this step S74, the data relay apparatus 100 may delete only records including the attribute value of the data value included in the received storage request message, out of the records each including "server 2" in the state management table 121. However, in this case, to determine a record to be deleted, the data relay apparatus 100 needs to acquire the attribute value from the storage request message, and search the state management table 121 using the acquired attribute value as a key.

On the other hand, by deleting all records each including "server 2", the data relay apparatus 100 only needs to determine the storage destination but has no need to acquire the attribute value or search the state management table 121 using the acquired attribute value as a key, so as to determine the record to be deleted. Therefore, it is possible to reduce the processing load on the data relay apparatus 100.

Thereafter, the data relay apparatus 100 transmits a storage request message in which the data identifier "key 2", the data value "value 2", and the attribute value "xxx" are set to the data storage server 200b (step S75). The data storage server 200b having received the storage request message stores the contents including the data identifier "key 2", the data value "value 2", and the attribute value "xxx" in a predetermined area of the storage device 201b (step S76).

The data storage server 200b transmits a storage response message indicating that the storage processing has been normally completed to the data relay apparatus 100 (step S77). The data relay apparatus 100 transmits a storage response message indicating that the storage processing has been normally completed to the data-generating apparatus 300a (step S78).

When a request for deleting the contents corresponding to the data identifier "key 2" is sent from the data-generating apparatus 300a, the processes in FIGS. 11 and 12 are modified as follows: In the steps S61, S64, S71, and S75, a deletion request message specifying the data identifier "key 2" is transmitted in place of the storage request message. In the steps S65 and S76, the data storage server 200b deletes the contents including the specified data identifier "key 2" from the storage device 201b. In the steps S66, S67, S77, and S78, a deletion response message is transmitted in place of the storage response message.

Figure 13:
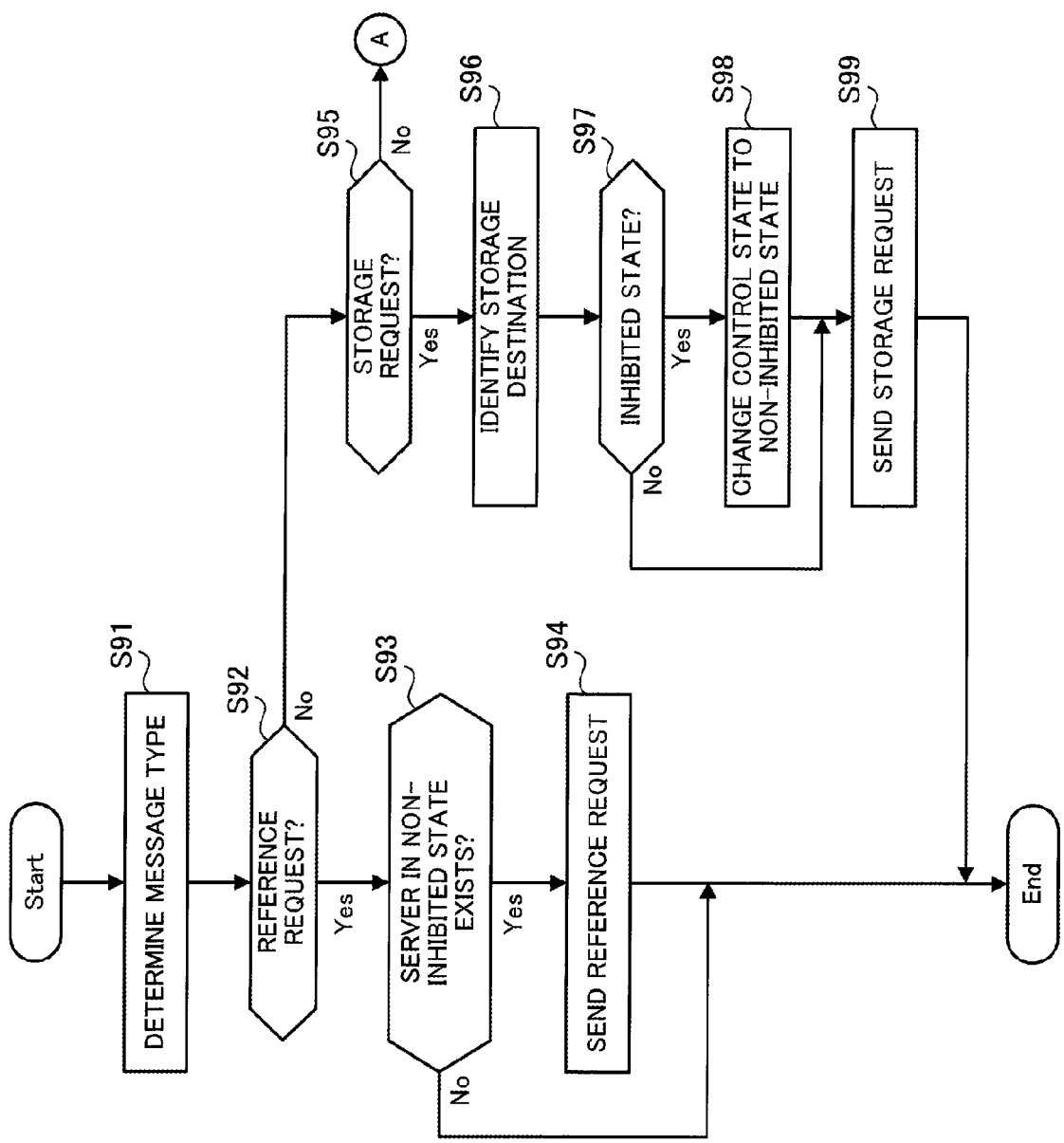
FIG. 13 is a flowchart of an example of a process executed by the data relay apparatus.
Figure 14:
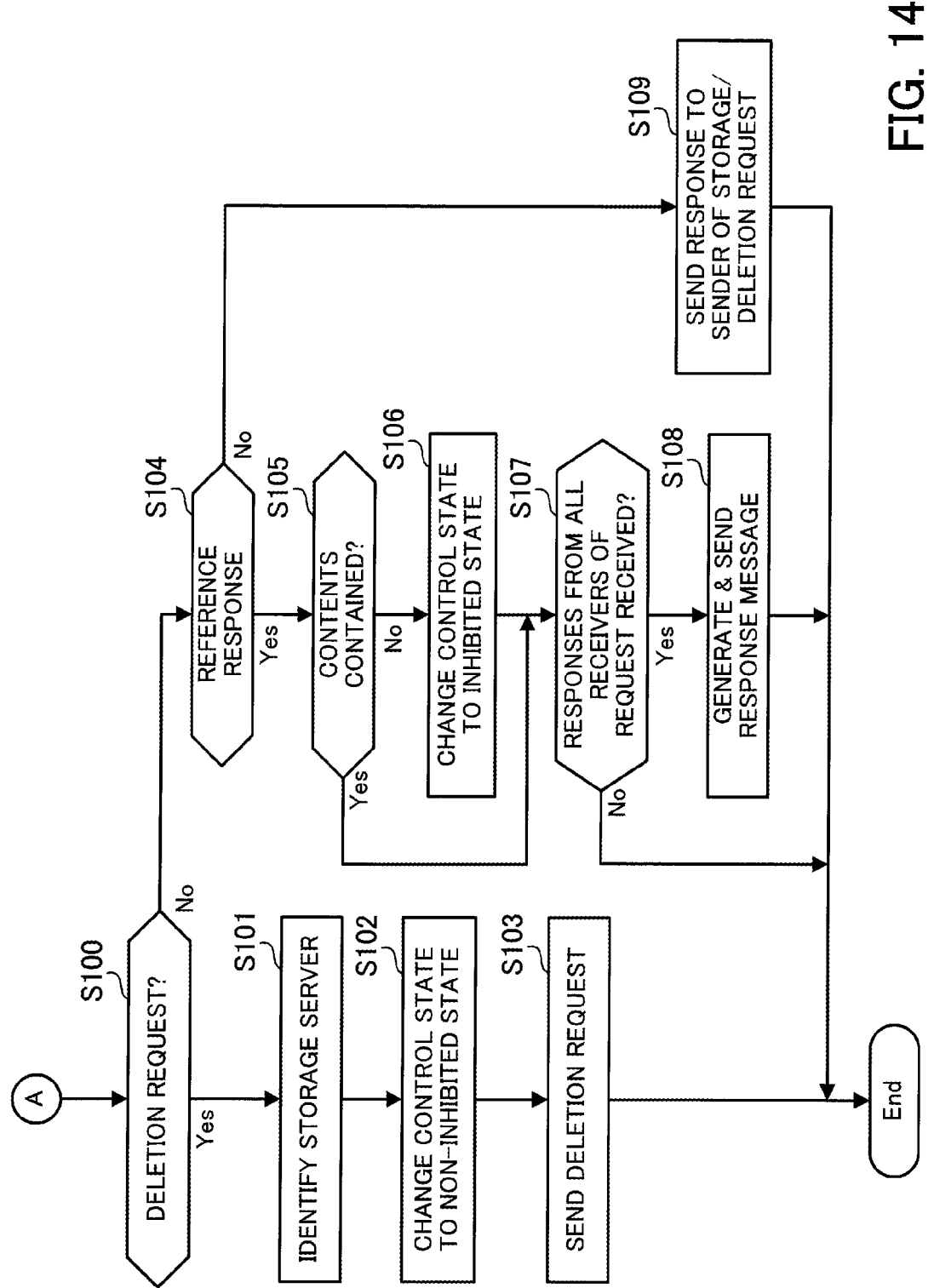
FIG. 14 is a continuation of FIG. 13.

Next, FIGS. 13 and 14 are a flowchart of an example of a process executed by the data relay apparatus. The process in FIGS. 13 and 14 is executed whenever the interface processing unit 111 receives a message. Note that in FIGS. 13 and 14, the reference process executed in the case where a data identifier is specified as a reference condition is omitted.

[Step S91] The data relay apparatus 100 receives a message. The interface processing unit 111 determines a message type of the received message.

[Step S92] If the received message is a reference request message, the interface processing unit 111 outputs the received message to the reference processing unit 113. Then, a step S93 is executed. On the other hand, if the received message is not a reference request message, a step S95 is executed.

[Step S93] The reference processing unit 113 queries the status management unit 115 about the control state of each data storage server, and determines whether or not there is a data storage server in the non-inhibited state. If there is one or more data storage servers in the non-inhibited state, a step S94 is executed. On the other hand, if there is no data storage server in the non-inhibited state, the process is terminated.

More specifically, the reference processing unit 113 notifies the status management unit 115 of the attribute value specified as a reference condition in the received reference request message. The status management unit 115 extracts a record including the notified attribute value from the state management table 121. The status management unit 115 notifies the reference processing unit 113 of the data storage server corresponding to the server address included in the extracted record as the data storage server in the inhibited state.

[Step S94] The reference processing unit 113 instructs the interface processing unit 111 to transmit a reference request message specifying the attribute value as a reference condition to the data storage server determined to be in the non-inhibited state. The interface processing unit 111 transmits the reference request message to the data storage server determined to be in the non-inhibited state according to the instruction.

[Step S95] If the received message is a storage request message, the interface processing unit 111 outputs the received message to the storage processing unit 112. Then, a step S96 is executed. On the other hand, if the received message is neither a reference request message nor a storage request message, a step S100 in FIG. 14 is executed.

[Step S96] The storage processing unit 112 acquires a data identifier from the received storage request message, and identifies, based on the acquired data identifier, a data storage server as a storage destination where the contents are to be stored (hereinafter referred to as the storage destination server).

[Step S97] The storage processing unit 112 queries the status management unit 115 about the control state of the storage destination server to determine whether or not the control state is the inhibited state. At this time, if a record including the server address of the storage destination server is registered in the state management table 121, the status management unit 115 notifies the storage processing unit 112 that the storage destination server is in the inhibited state. On the other hand, if a record including the server address of the storage destination server is not registered in the state management table 121, the status management unit 115 notifies the storage processing unit 112 that the storage destination server is in the non-inhibited state.

If the storage destination server is in the inhibited state, a step S98 is executed. On the other hand, if the storage destination server is in the non-inhibited state, a step S99 is executed.

[Step S98] The storage processing unit 112 instructs the status management unit 115 to change the control state of the storage destination server to the non-inhibited state. The status management unit 115 deletes all records each including the server address of the storage destination server from the state management table 121.

[Step S99] The storage processing unit 112 instructs the interface processing unit 111 to transmit a storage request message to the storage destination server. The interface processing unit 111 transmits the storage request message to the storage destination server according to the instruction.

[Step S100] If the received message is a deletion request message, the interface processing unit 111 outputs the received message to the storage processing unit 112. Then, a step S101 is executed. On the other hand, if the received message is neither a reference request message nor a storage request message nor a deletion request message, a step S104 is executed.

[Step S101] The storage processing unit 112 acquires a data identifier from the received deletion request message, and identifies, based on the acquired data identifier, a data storage server storing the contents requested to be deleted (hereinafter referred to as the storage server).

[Step S102] The storage processing unit 112 instructs the status management unit 115 to change the control state of the storage server to the non-inhibited state. At this time point, there may be a case where a record including the server address of the storage server is registered in the state management table 121, and a case where that no such a record is registered in the same. If one or more records each including the server address of the storage server is/are registered in the state management table 121, the status management unit 115 deletes the record(s).

[Step S103] The storage processing unit 112 instructs the interface processing unit 111 to transmit a deletion request message to the storage server. The interface processing unit 111 transmits the deletion request message to the storage server according to the instruction.

[Step S104] If the answer to the question of the step S100 is negative "No", the message received by the data relay apparatus 100 is a response message, and the interface processing unit 111 outputs the received message to the response processing unit 114. If the received message is a reference response message, a step S105 is executed. On the other hand, if the received message is a storage response message or a deletion response message, a step S109 is executed.

[Step S105] The response processing unit 114 determines, based on the data size of the item of the contents of the received reference response message, whether or not the contents are contained in the reference response message. If the contents are contained, a step S107 is executed. On the other hand, if the contents are not contained, a step S106 is executed.

[Step S106] The response processing unit 114 instructs the status management unit 115 to change the control state of the data storage server which has transmitted the reference response message to the inhibited state. At this time, the response processing unit 114 notifies the status management unit 115 of the server address of the data storage server which has transmitted the reference response message, and the attribute value specified as a reference condition in the reference request message corresponding to the reference response message. The status management unit 115 registers a record including the notified server address and attribute value in the state management table 121.

[Step S107] The response processing unit 114 determines whether or not the reference response messages have been received from all of the data storage servers to each of which the reference request message has been transmitted. If the reference response messages have been received from all of the data storage servers to each of which the reference request message has been transmitted, a step S108 is executed. On the other hand, if there remains any reference response message which has not been received from the data storage servers to each of which the reference request message has been transmitted, the process is terminated.

[Step S108] The response processing unit 114 merges the contents received from the data storage servers to each of which the reference request message has been transmitted to generate a reference response message, and transmits the generated reference response message to the data-referring apparatus as a sender of the reference request.

[Step S109] If the received message is a storage response message, the response processing unit 114 transmits a storage response message to the data-generating apparatus as a sender of the storage request. Further, if the received message is a deletion response message, the response processing unit 114 transmits a deletion response message to the data-generating apparatus as a sender of the deletion request.

(c) Third Embodiment

A data relay apparatus according to a third embodiment is configured by adding a function of caching part of the contents requested to be stored in a data storage server to the data relay apparatus 100 according to the second embodiment. When a reference request specifying an attribute value as a reference condition is received, if the contents matching the specified attribute value are cached, the data relay apparatus 100 transmits the cached contents to the sender of the reference request to thereby reduce the number of reference requests to be transmitted to the data storage servers.

Figure 15:
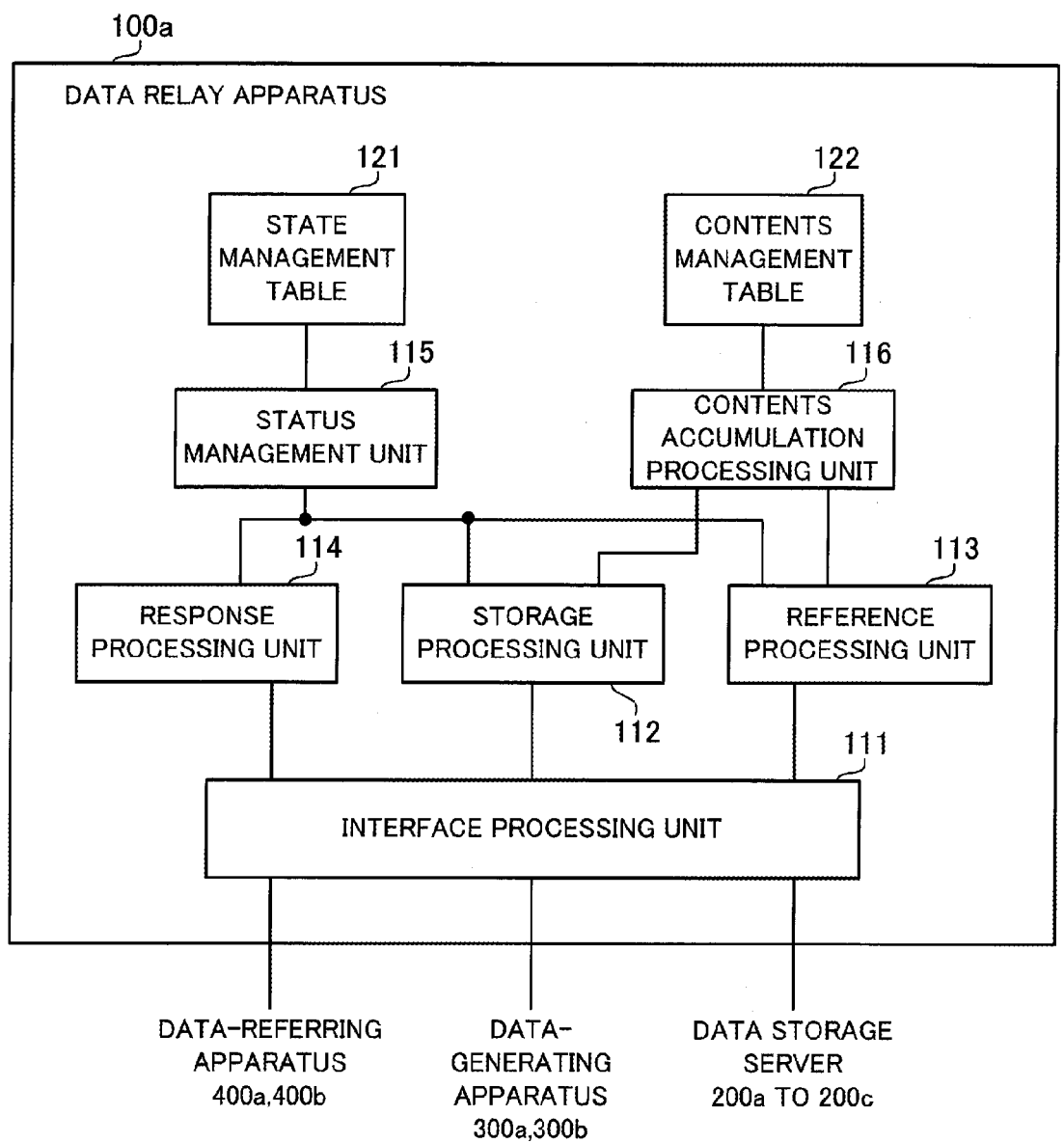
FIG. 15 is a block diagram of an example of the configuration of functions equipped in a data relay apparatus according to a third embodiment.

FIG. 15 is a block diagram of an example of the configuration of functions equipped in the data relay apparatus according to the third embodiment. In FIG. 15, component elements corresponding to those in FIG. 7 are denoted by the same reference numerals.

The data relay apparatus, denoted by reference numeral 100a, includes the interface processing unit 111, the storage processing unit 112, the reference processing unit 113, the response processing unit 114, and the status management unit 115, and further includes a contents accumulation processing unit 116. A process executed by the contents accumulation processing unit 116 is realized e.g. by executing a predetermined program by the CPU included in the data relay apparatus 100a. Further, in the storage unit (e.g. the HDD) of the data relay apparatus 100a, a contents management table 122 is stored. The contents management table 122 functions as a cache unit in which the contents are temporarily accumulated.

The contents accumulation processing unit 116 performs registration of the contents in the contents management table 122, reading of the contents from the contents management table 122, and deletion of the contents registered in the contents management table 122.

Figure 16:
FIG. 16 illustrates an example of information registered in a contents management table.

FIG. 16 illustrates an example of information registered in the contents management table.

In each record in the contents management table 122, an accumulation time is registered in association with the contents including a data identifier, a data value, and an attribute value of the data value. The accumulation time indicates a time at which the contents were accumulated in the contents management table 122.

FIG. 17 illustrates an example of information registered in the state management table in the third embodiment.

In the third embodiment, in the state management table 121, a record including not only items of "server address" and "reference condition", but also items of "control state" and "state change time" are registered. In the item of "control state", the above-described "inhibited state" or "accumulated state" indicative of a state where the contents are accumulated is registered.

In the third embodiment, when a request for storing the contents has been received from a data-generating apparatus, the storage processing unit 112 refers to the state management table 121. If the records each including the server address indicative of the data storage server as the storage destination where the contents are to be stored are set to the inhibited state, the storage processing unit 112 changes the control state of these records to the accumulated state, and accumulates the contents in the contents management table 122.

In the item of the state change time, a time at which the control state of the corresponding record was changed from the inhibited state to the accumulated state is registered.

Next, an example of the processes executed by the storage system according to the present embodiment will be described with reference to sequence diagrams.

First, the process executed in the case where the data relay apparatus 100a receives a reference request specifying e.g. the attribute value "xxx" as a reference condition from the data-referring apparatus 400a, and no record including the attribute value "xxx" has been registered in the state management table 121 (i.e. the data storage servers are all in the non-inhibited state) is the same as the process in FIG. 9. However, in the step S40, when the data relay apparatus 100a generates a record including "server 2" indicative of the server address of the data storage server 200b which has not transmitted the contents in the state management table 121, the data relay apparatus 100a registers the attribute value "xxx" in the item of the reference condition, and the inhibited state in the item of the control state in the generated record. If the inhibited state is registered in the item of the control state, nothing is registered in the item of the state change time.

Further, the process executed in the case where the data relay apparatus 100a receives a reference request specifying the attribute value "xxx" as a reference condition from the data-referring apparatus 400a again after execution of the process in FIG. 9 is the same as the process in FIG. 10. In this case, in the step S52 in FIG. 10, the data relay apparatus 100a extracts a record in which "server 2" indicative of the data storage server 200b is registered in the item of the server address, the attribute value "xxx" is registered in the item of the reference condition, and the inhibited state is registered in the item of the control state from the state management table 121, and determines that the data storage server 200b is in the inhibited state.

A reference process executed in a case where the control state of the server address associated with the specified attribute value "xxx" is set to the accumulated state will be described hereinafter with reference to FIG. 20.

Next, a process executed in a case where the data-generating apparatus 300a has transmitted a storage request message in which the data identifier "key 2", the data value "value 2", and the attribute value "xxx" are set, to the data relay apparatus 100a, is executed as follows:

The process executed in the case where the storage destination server is determined, based on the data identifier "key 2", that it is in the non-inhibited state is the same as the process in FIG. 11. On the other hand, if the storage destination server is determined, based on the data identifier "key 2", that it is in the inhibited state, a process as described hereinafter with reference to FIG. 18 is executed.

Figure 18:
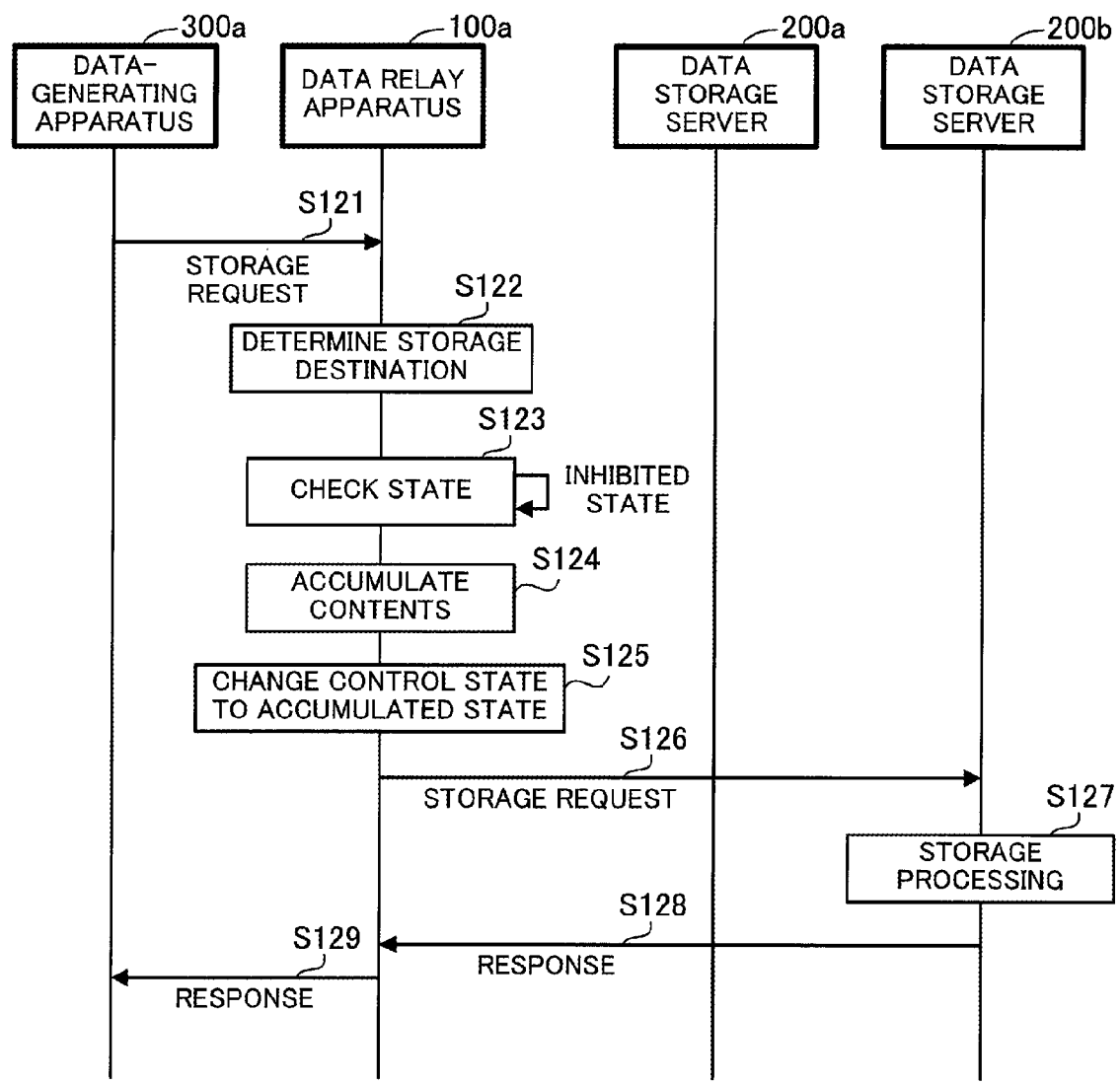
FIG. 18 is a third sequence diagram of an example of a process for storing contents.

FIG. 18 is a third sequence diagram of an example of the process for storing the contents.

The data-generating apparatus 300a transmits a storage request message in which the data identifier "key 2", the data value "value 2", and the attribute value "xxx" are set, to the data relay apparatus 100a (step S121). The data relay apparatus 100a determines, based on the data identifier "key 2", that the data storage server 200b, for example, is a storage destination where the contents are to be stored (step S122).

The data relay apparatus 100a refers to the state management table 121 to check the control state of the data storage server 200b (step S123). More specifically, the data relay apparatus 100a extracts a record including the server address of the data storage server 200b determined as the storage destination from the state management table 121, and determines whether or not the extracted record is set to the inhibited state.

It is assumed here that the records each including the server address of the data storage server 200b are registered in the state management table 121, and those records are set to the inhibited state. In this case, the data relay apparatus 100a accumulates the contents contained in the received storage request message, i.e. the contents including the data identifier "key 2", the data value "value 2", and the attribute value "xxx" in the contents management table 122 (step S124). At this time, the data relay apparatus 100a registers the current time in the item of the accumulation time associated with the accumulated contents.

Further, the data relay apparatus 100a changes the control state of all records each including the server address of the data storage server 200b out of the records registered in the state management table 121 to the accumulated state (step S125). At this time, the data relay apparatus 100a registers the current time in the item of the state change time of each record including the server address "server 2" of the data storage server 200b.

In the step S125, the data relay apparatus 100a may delete only records including the attribute value included in the received storage request message out of the records each including the server address "server 2" in the state management table 121. However, by changing the control state of all records each including "server 2" to the accumulated state in the step S125, the data relay apparatus 100a has no need to acquire the attribute value from the received storage request message, which makes it possible to reduce the processing load on the data relay apparatus 100a.

Thereafter, the data relay apparatus 100a transmits a storage request message in which the data identifier "key 2", the data value "value 2", and the attribute value "xxx" are set, to the data storage server 200b (step S126). The data storage server 200b having received the storage request message stores the contents contained in the received storage request message in a predetermined area of the storage device 201b (step S127).

The data storage server 200b transmits a storage response message indicating that the storage processing has been normally completed to the data relay apparatus 100a (step S128). The data relay apparatus 100a transmits a storage response message indicating that the storage processing has been normally completed to the data-generating apparatus 300a (step S129).

According to the above-described process in FIG. 18, the data relay apparatus 100a caches the contents to be stored in the contents management table 122 only when a limitation condition that a storage destination where the contents are to be stored is set to the inhibited state is satisfied. This makes it possible to reduce a storage area to cache the contents.

Figure 19:
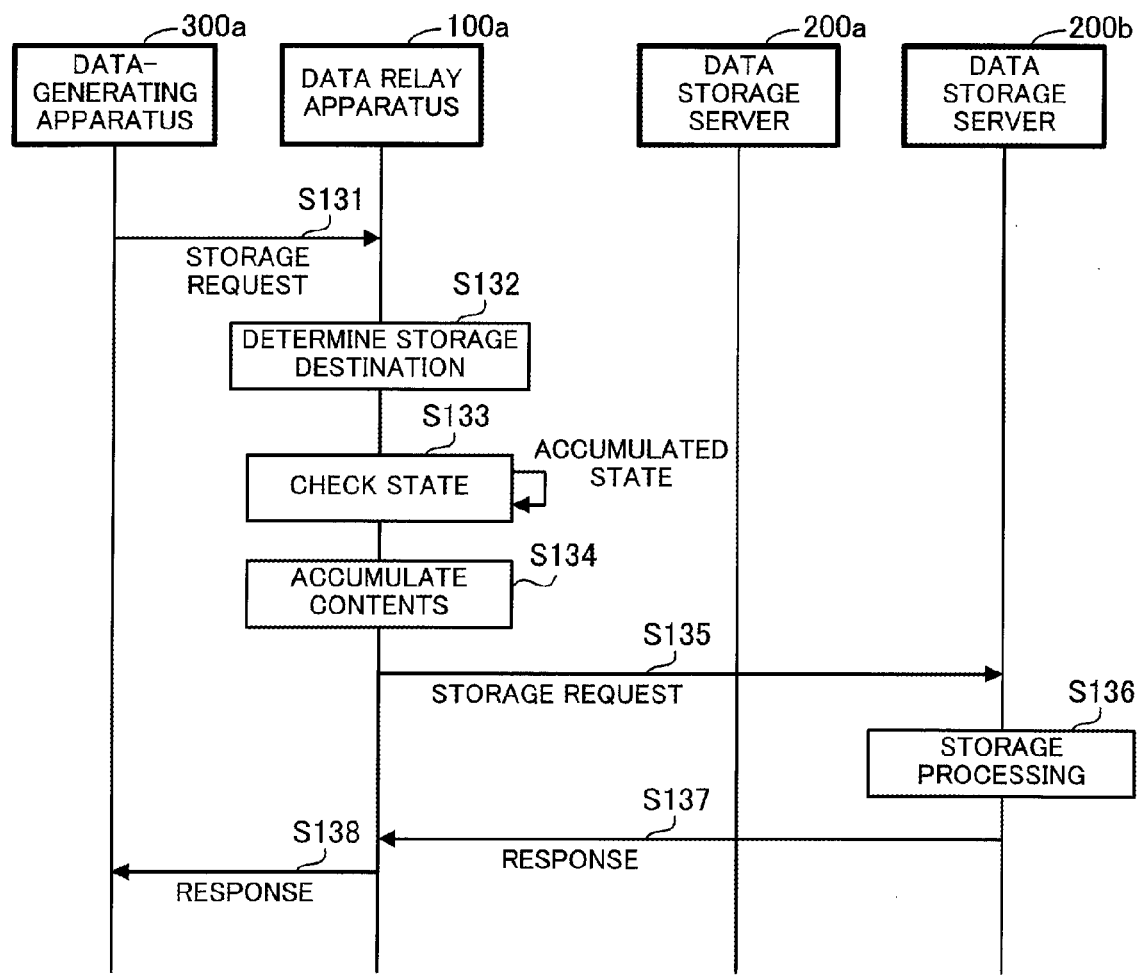
FIG. 19 is a fourth sequence diagram of an example of the process for storing contents.

FIG. 19 is a fourth sequence diagram of an example of the process for storing the contents. FIG. 19 illustrates an example of the process executed in a case where a storage destination where the contents are to be stored is set to the accumulated state.

The data-generating apparatus 300a transmits a storage request message in which, for example, the data identifier "key 2", the data value "value 4", and the attribute value "xxx" are set, to the data relay apparatus 100a (step S131). The data relay apparatus 100a sets a storage destination where the contents are to be stored to the data storage server 200b based on the data identifier "key 2" (step S132).

The data relay apparatus 100a refers to the state management table 121 to check the control state of the data storage server 200b (step S133). More specifically, the data relay apparatus 100a extracts a record including the server address of the data storage server 200b determined as the storage destination from the state management table 121, and determines whether or not the extracted record is set to the inhibited state.

It is assumed here that the records each including the server address of the data storage server 200b are registered in the state management table 121, and those records are set to the accumulated state. In this case, the data relay apparatus 100a accumulates the contents contained in the received storage request message, i.e. the contents including the data identifier "key 2", the data value "value 4", and the attribute value "xxx" in the contents management table 122 (step S134). At this time, the data relay apparatus 100a registers the current time in the item of the accumulation time associated with the accumulated contents.

In the step S134, if the contents including the data identifier "key 2" and the attribute value "xxx" have already been accumulated in the contents management table 122, the received contents are newly written over the accumulated contents. For example, when the process in FIG. 19 is executed after execution of the process in FIG. 18, the contents including the data identifier "key 2", the data value "value 2", and the attribute value "xxx" have already been registered in the contents management table 122. In this case, the data relay apparatus 100a updates the contents including the data identifier "key 2", the data value "value 2", and the attribute value "xxx" to the contents including the data identifier "key 2", the data value "value 4", and the attribute value "xxx".

Thereafter, the data relay apparatus 100a transmits a storage request message in which the data identifier "key 2", the data value "value 4", and the attribute value "xxx" are set, to the data storage server 200b (step S135). The data storage server 200b stores the contents contained in the received storage request message in a predetermined area of the storage device 201b (step S136).

The data storage server 200b transmits a storage response message indicating that the storage processing has been normally completed to the data relay apparatus 100a (step S137). The data relay apparatus 100a transmits a storage response message indicating that the storage processing has been normally completed to the data-generating apparatus 300a (step S138).

Next, a reference process executed in a case where the control state of the server address associated with the specified attribute value "xxx" is set to the accumulated state in the state management table 121 will be described with reference to FIG. 20. FIG. 20 is a third sequence diagram of an example of the process for referring to the contents matching an attribute value.

The data-referring apparatus 400a transmits a reference request message specifying e.g. an attribute value "xxx" as a reference condition to the data relay apparatus 100a (step S141). The data relay apparatus 100a refers to the state management table 121 to check the control states (step S142). In this example, the data relay apparatus 100a extracts a record including the attribute value "xxx" and the server address "server 2" of the data storage server 200b from the state management table 121, and determines that the data storage server 200b is in the accumulated state.

The data relay apparatus 100a transmits a reference request specifying the attribute value "xxx" as a reference condition to the data storage servers except the data storage server 200b in the accumulated state (i.e. to the data storage server 200a) (step S143). At this time, the reference request is not transmitted to the data storage server 200b in the accumulated state.

In the step S142, there may be a record in which an address of a server other than the data storage server 200b is set and the server is set to the inhibited state, among the records each including the attribute value "xxx" in the state management table 121. In this case, in the step S143, the data relay apparatus 100a does not transmit the reference request to the data storage server registered in the record which includes the attribute value "xxx" and is set to the inhibited state, either.

The data storage server 200a searches the storage device 201a for the contents matching the attribute value "xxx" (step S144), and reads out the contents matching the attribute value "xxx" from the storage device 201a. The data storage server 200a transmits a reference response message containing the read contents to the data relay apparatus 100a (step S145).

The data relay apparatus 100a checks the data size of the item of the contents in the reference response message received from the data storage server 200a (step S146). In this step, the data relay apparatus 100a determines that the data size of the item of the contents is larger than 0, and the contents are stored in this item, and hence the data relay apparatus 100a performs no registration processing for the state management table 121.

The data relay apparatus 100a refers to the contents accumulated in the contents management table 122 (step S147), and determines whether or not the contents to be referred to are accumulated (step S148).

The data relay apparatus 100a determines, based on the data identifier registered in each record in the contents management table 122, records including the contents stored in the data storage server determined to be in the accumulated state in the step S142. For example, when employing a method of determining a storage destination where the contents are stored, in which if a data identifier added to the contents is "key 2", the contents are stored in the data storage server 200b, the data relay apparatus 100a determines records each including the data identifier "key 2" in the step S148.

Further, the data relay apparatus 100a extracts records including the attribute value "xxx" specified in the reference request message from the determined records.

When the corresponding record has been extracted according to the above-described procedure, the data relay apparatus 100a reads out the contents from the extracted record, and deletes the extracted record from the contents management table 122. Further, the data relay apparatus 100a deletes the record including the attribute value "xxx" and the server address "server 2" of the data storage server 200b, which has been extracted in the step S142, from the state management table 121, and changes the control state of the data storage server 200b to the non-inhibited state.

On the other hand, if the corresponding record has not been extracted according to the above-described procedure, the data relay apparatus 100a changes the control state of the record including attribute value "xxx" and the server address "server 2" of the data storage server 200b, which has been extracted in the step S142, to the inhibited state.

Note that the steps S144 to S146 and the steps S147 and S148 are executed in parallel.

Thereafter, the data relay apparatus 100a merges the contents received from the data storage server 200a in the step S145 and the contents read out from the contents management table 122 in the step S148 to create a reference response message (step S149). The data relay apparatus 100a transmits the created reference response message to the data-referring apparatus 400a (step S150).

Figure 20:
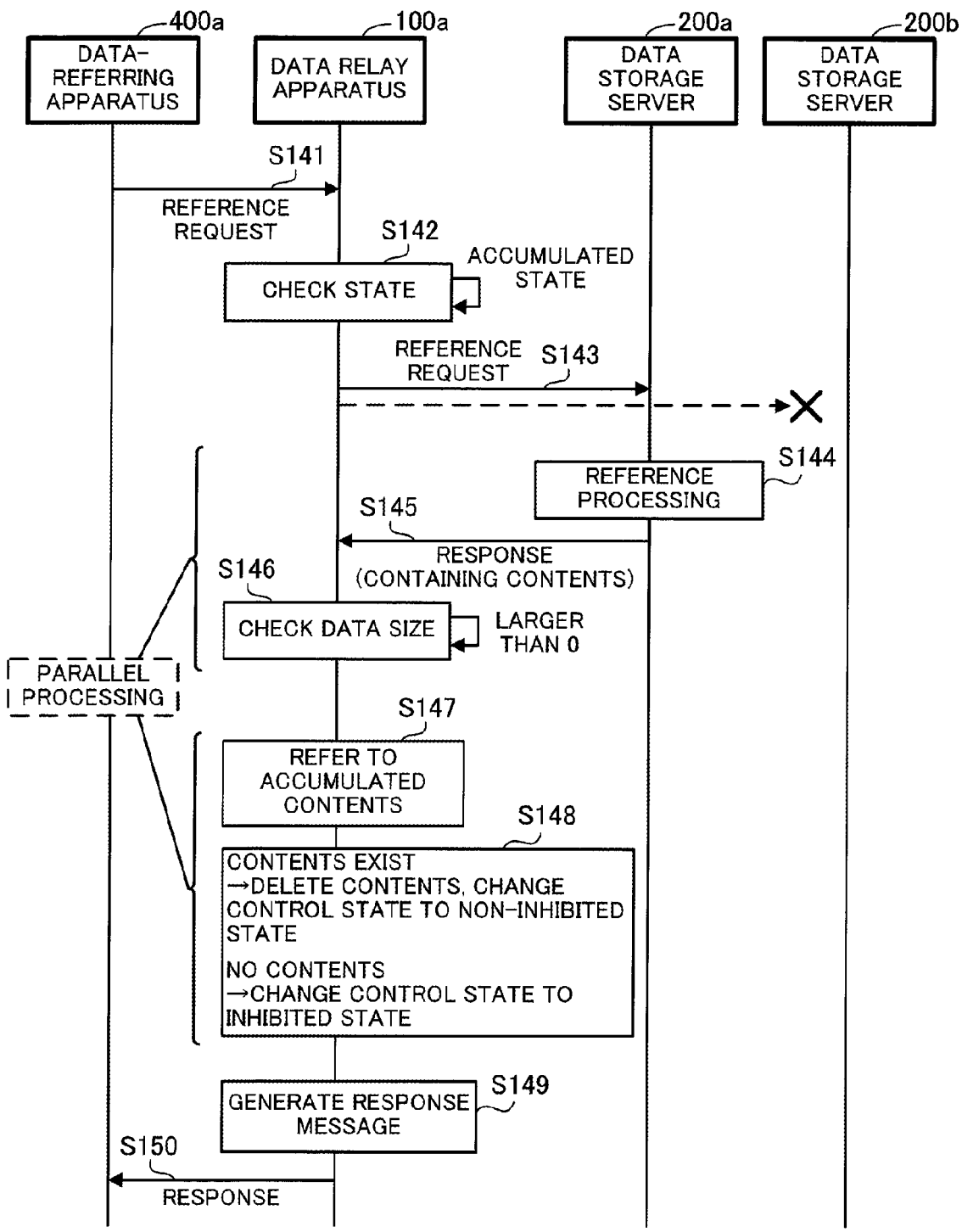
FIG. 20 is a third sequence diagram of an example of the process for referring to the contents matching an attribute value.

In the steps S142 and S143 in FIG. 20, the data relay apparatus 100a does not transmit the reference request not only to the data storage server in which the contents matching the specified attribute value are not stored, but also to the data storage server set to the accumulated state among the data storage servers storing the contents matching the specified attribute value. This makes it possible to further reduce the amount of data transferred over the network 501.

Further, only during a time period after the data relay apparatus 100a has changed the control state of a data storage server storing certain contents to the accumulated state and before the data relay apparatus 100a first receives a reference request estimated to be a request for referring to the same contents, the data relay apparatus 100a caches the contents in the contents management table 122. The data relay apparatus 100a caches the contents only during such a limited time period, which makes it possible to reduce the capacity of the area for caching the contents.

Next, a process for deleting the contents will be described. The process executed in the case where the control state of the data storage server storing the contents to be deleted is in the non-inhibited state and the inhibited state are the same as those described in the second embodiment. Further, a process in a case where the control state of the data storage server storing the contents to be deleted is in the accumulated state is illustrated in FIG. 21.

Figure 21:
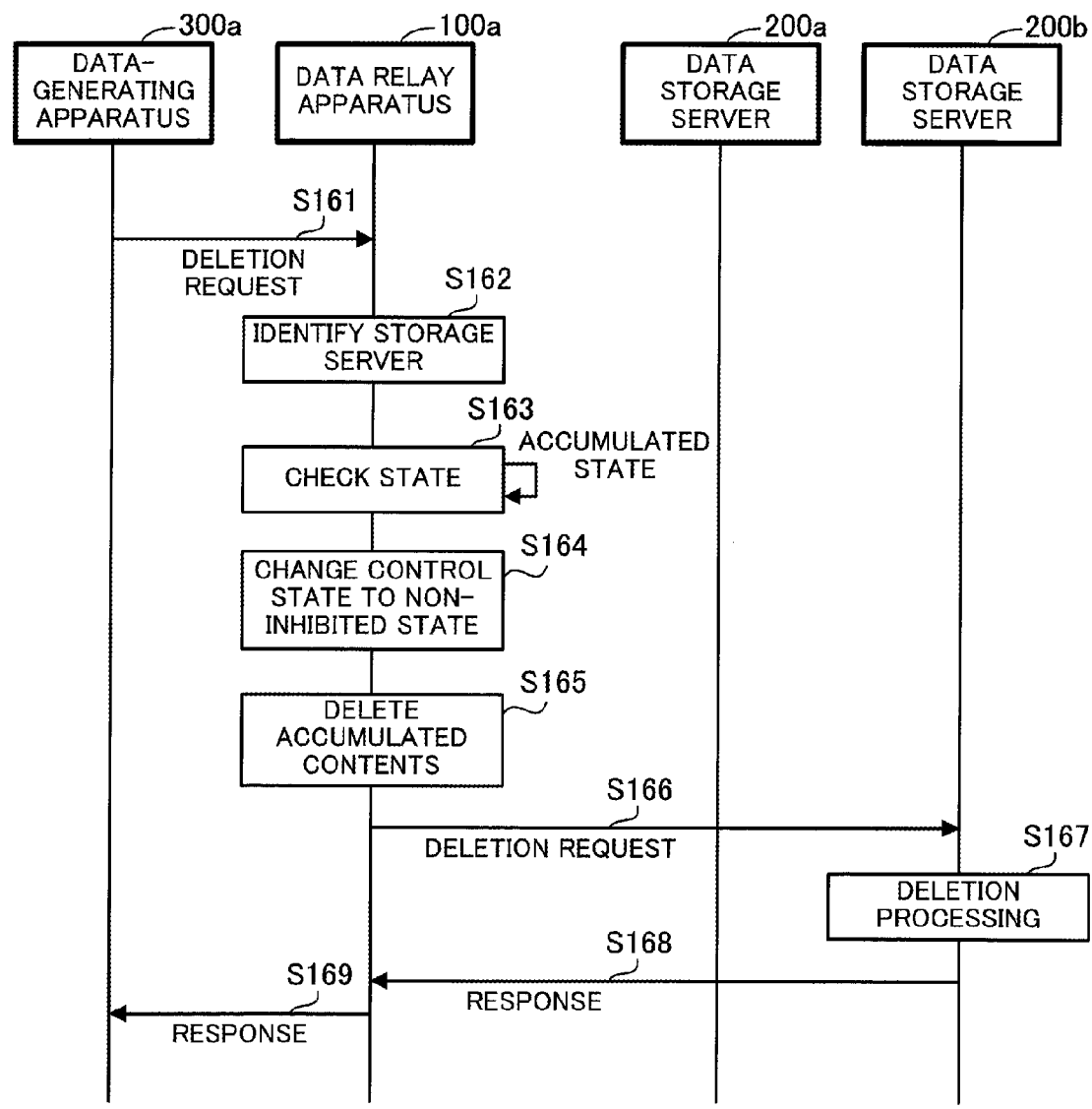
FIG. 21 is a sequence diagram of an example of a process for deleting contents.

FIG. 21 is a sequence diagram of an example of the process for deleting the contents.

The data-generating apparatus 300a transmits a deletion request message specifying, for example, the data identifier "key 2", to the data relay apparatus 100a (step S161). The data relay apparatus 100a identifies, based on the data identifier "key 2", the data storage server 200b as a storage destination where the contents are stored (step S162).

The data relay apparatus 100a refers to the state management table 121 to check the control state of the data storage server 200b (step S163). More specifically, the data relay apparatus 100a extracts a record including the server address of the data storage server 200b storing the contents from the state management table 121, and determines whether or not the extracted record is set to the accumulated state.

It is assumed here that the records each including the server address of the data storage server 200b are registered in the state management table 121, and the records are set to the accumulated state. In this case, the data relay apparatus 100a deletes all records each including the server address of the data storage server 200b from the state management table 121, and changes the control state of the data storage server 200b to the non-inhibited state (step S164). Along with this, the data relay apparatus 100a deletes all contents each including the data identifier "key 2" from the contents management table 122 (step S165).

Thereafter, the data relay apparatus 100a transmits a deletion request message specifying the data identifier "key 2", to the data storage server 200b (step S166). The data storage server 200b deletes the contents including the data identifier "key 2" from the storage device 201b (step S167).

The data storage server 200b transmits a deletion response message indicating that the deletion processing has been normally completed, to the data relay apparatus 100a (step S168). The data relay apparatus 100a transmits a deletion response message indicating that the deletion processing has been normally completed, to the data-generating apparatus 300a (step S169).

Figure 22:
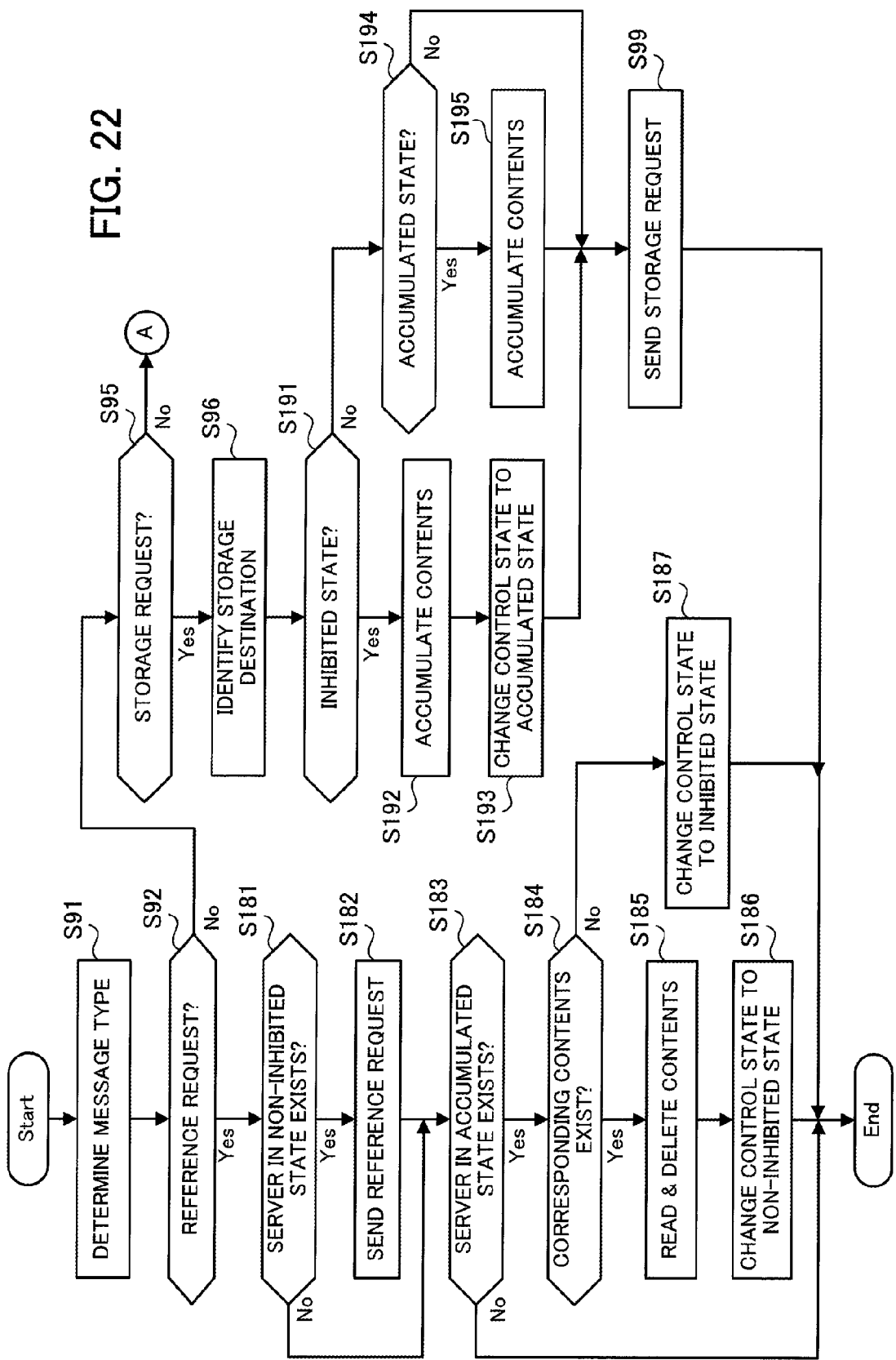
FIG. 22 is a flowchart of an example of a process executed by the data relay apparatus.
Figure 23:
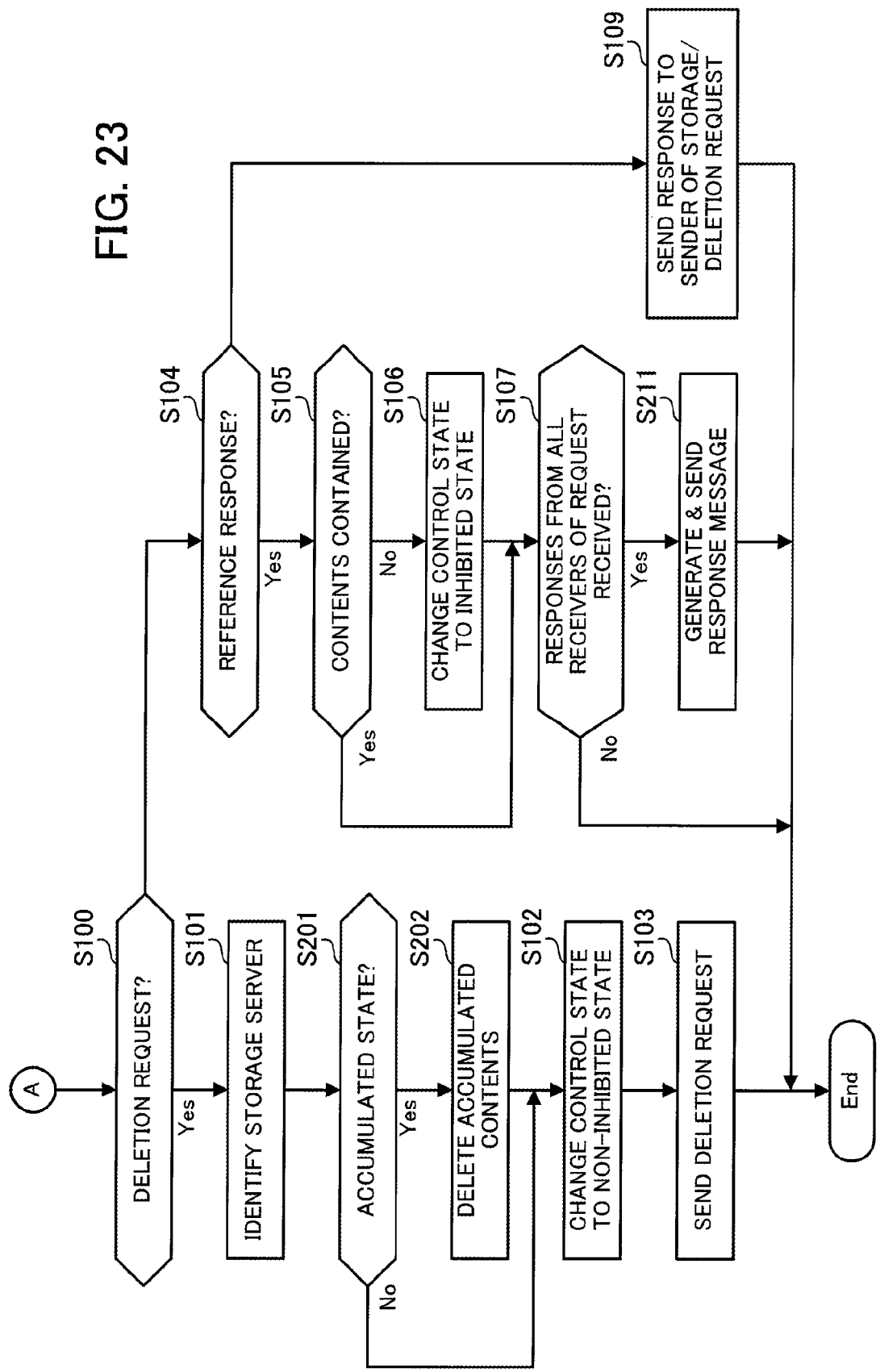
FIG. 23 is a continuation of FIG. 22.

Next, FIGS. 22 and 23 are a flowchart of an example of a process executed by the data relay apparatus. The process in FIGS. 22 and 23 is executed whenever the interface processing unit 111 receives a message.

In FIGS. 22 and 23, steps in which the same processing as in FIGS. 13 and 14 is executed are denoted by the same step numbers. Hereinafter, the description will be given mainly of different steps from FIGS. 13 and 14. Further, similarly to the description in FIGS. 13 and 14, the reference process executed in the case where a data identifier is specified as a reference condition is omitted in FIGS. 22 and 23.

If it is determined in the step S92 in FIG. 13 that the received message is a reference request message, the following steps S181 to S187 are executed in place of the steps S93 and S94 in FIG. 13.

[Step S181] The reference processing unit 113 queries the status management unit 115 about the control state of each data storage server to determine whether or not there is a data storage server in the non-inhibited state.

More specifically, the reference processing unit 113 notifies the status management unit 115 of an attribute value specified as a reference condition in the received reference request message. The status management unit 115 extracts records including the notified attribute value from the state management table 121. The status management unit 115 notifies the reference processing unit 113 of a combination of a server address and an associated control state included in each extracted record.

The reference processing unit 113 determines a data storage server corresponding to a server address not notified from the status management unit 115 as a data storage server in the non-inhibited state. If there is one or more data storage servers in the non-inhibited state, a step S182 is executed. On the other hand, if there is no data storage server in the non-inhibited state, a step S183 is executed.

[Step S182] The reference processing unit 113 instructs the interface processing unit 111 to transmit a reference request message specifying the attribute value as a reference condition, to the data storage server determined to be in the non-inhibited state. The interface processing unit 111 transmits the reference request message to the data storage server determined to be in the non-inhibited state according to the instruction.

[Step S183] The reference processing unit 113 determines whether or not there is a data storage server in the accumulated state. If a server address set to the accumulated state is notified from the status management unit 115 in the step S181, the reference processing unit 113 determines a data storage server corresponding to the notified server address as the data storage server in the accumulated state. At this time, the reference processing unit 113 acquires the state change time associated with the notified server address in the contents management table 122 from the contents accumulation processing unit 116.

If there is one or more data storage servers in the accumulated state exist, a step S184 is executed. On the other hand, if there is no data storage server in the accumulated state, the process is terminated.

[Step S184] The reference processing unit 113 notifies the contents accumulation processing unit 116 of the server address of each data storage server in the accumulated state and the attribute value specified as a reference condition, and queries the contents accumulation processing unit 116 about whether or not the contents corresponding to the notified information have been accumulated in the contents management table 122. At this time, the reference processing unit 113 also notifies the status management unit 115 of each associated state change time acquired from the contents accumulation processing unit 116 in the step S183.

The contents accumulation processing unit 116, first, extracts records from the contents management table 122, in which the accumulation time after the state change time notified from the reference processing unit 113 is registered. This makes it possible to narrow down records to be fully examined to ones which were registered or updated after a change of the control state to the accumulated state, and thereby reduce the processing load on the contents accumulation processing unit 116.

Next, the contents accumulation processing unit 116 determines, based on the data identifier registered in each record in the contents management table 122, a record including the contents stored in the data storage server corresponding to each server address notified from the reference processing unit 113, out of the extracted records. Further, the contents accumulation processing unit 116 extracts records including the attribute value notified from the reference processing unit 113, from the determined records.

If any record is extracted according to the above-described procedure, the extracted record contains the contents corresponding to the information notified from the reference processing unit 113. In this case, a step S185 is executed. On the other hand, if the no record is extracted according to the above-described procedure, a step S187 is executed.

[Step S185] The contents accumulation processing unit 116 reads out the contents from the record extracted in the step S184, and temporarily stores the read contents in a predetermined storage area (e.g. the RAM). The contents stored at this time are to be read out by the reference processing unit 113 in a step S211 hereinafter.

Further, the reference processing unit 113 instructs the contents accumulation processing unit 116 to delete the extracted record. The contents accumulation processing unit 116 deletes the record extracted in the step S184 from the contents management table 122.

[Step S186] The reference processing unit 113 notifies the status management unit 115 of the server address of the data storage server determined to be in the accumulated state in the step S183 and the specified attribute value, and instructs the status management unit 115 to change the control state of a combination of the notified server address and attribute value to the non-inhibited state. The status management unit 115 deletes the record including the notified server address and attribute value from the state management table 121.

By execution of the above steps S185 and S186, the contents accumulated in the contents management table 122 are deleted from the contents management table 122 when the contents are read out once. This makes it possible to prevent the capacity of the contents management table 122 from increasing.

[Step S187] The reference processing unit 113 notifies the status management unit 115 of the server address of the data storage server determined to be in the accumulated state in the step S183 and the specified attribute value, and instructs the status management unit 115 to change the control state of a combination of the notified server address and attribute value to the inhibited state. The status management unit 115 updates the control information of the record including the notified server address and attribute value, out of the records registered in the state management table 121, to the inhibited state.

Further, after execution of the step S96 in FIG. 13, the following steps S191 to S195 are executed in place of the steps S97 and S98 in FIG. 13.

[Step S191] The storage processing unit 112 queries the status management unit 115 about the control state of the storage destination server, and determines whether or not the control state is set to the inhibited state. At this time, if a record including the server address of the storage destination server is registered in the state management table 121 and the inhibited state is set in the record as the control state, the status management unit 115 notifies the storage processing unit 112 that the storage destination server is in the inhibited state.

If the storage destination server is in the inhibited state, a step S192 is executed. On the other hand, if the storage destination server is in the control state other than the inhibited state, a step S194 is executed.

[Step S192] The storage processing unit 112 instructs the contents accumulation processing unit 116 to accumulate the contents included in the received storage request message in the contents management table 122 together with the current time. The contents accumulation processing unit 116 generates a record in the contents management table 122 to store the contents therein, and registers the current time in the item of the accumulation time of the record.

[Step S193] The storage processing unit 112 instructs the status management unit 115 to change the control state of the storage destination server to the accumulated state. The status management unit 115 changes the item of the control state in all records each including the storage destination server, out of the records registered in the state management table 121, to the accumulated state, and registers the current time in the item of the accumulation time of each record.

[Step S194] The storage processing unit 112 determines whether or not the control state of the storage destination server is the accumulated state. If the record including the server address of the storage destination server is registered in the state management table 121 and the accumulated state is set in the record as the control state in the step S191, the status management unit 115 notifies the storage processing unit 112 that the storage destination server is in the accumulated state.

If the storage destination server is in the accumulated state, a step S195 is executed. On the other hand, if the storage destination server is in the control state other than the accumulated state, i.e. in the non-inhibited state, the step S99 is executed.

[Step S195] The storage processing unit 112 instructs the contents accumulation processing unit 116 to accumulate the contents included in the received storage request message in the contents management table 122 together with the current time. The contents accumulation processing unit 116 generates a record in the contents management table 122 to store the contents therein, and registers the current time in the item of the accumulation time of the record. Note that if a record including the data identifier and the attribute value in the contents instructed to be accumulated has already been registered in the contents management table 122, the contents accumulation processing unit 116 updates only the data value and the accumulation time in the record.

Further, the following steps S201 and S202 are executed between the steps S101 and S102 in FIG. 14.

[Step S201] The storage processing unit 112 queries the status management unit 115 about the control state of the storage server identified in the step S101, and determines whether or not the control state of the storage server is the accumulated state. The status management unit 115 extracts records including the server address of the storage server from the state management table 121, and notifies the storage processing unit 112 of the control state in each extracted record. Note that there is a case where no record including the server address of the storage server is registered in the state management table 121. In this case, the storage server is in the non-inhibited state.

If the storage server is in the accumulated state, the step S202 is executed. On the other hand, if the storage server is in the control state other than the accumulated state, the step S102 is executed.

[Step S202] The storage processing unit 112 instructs the contents accumulation processing unit 116 to delete all records each including the data identifier specified in the received deletion request message from the contents management table 122. The contents accumulation processing unit 116 deletes all records each including the specified data identifier from the contents management table 122. This deletes all of the contents each including the specified data identifier from the contents management table 122.

Further, the following step S211 is executed in place of the step S108 in FIG. 14.

[Step S211] The response processing unit 114 merges the contents received from the data storage servers to which the reference request message has been sent, and the contents temporarily stored in the predetermined storage area in the step S185 and read from the contents management table 122 to thereby generate a reference response message. The response processing unit 114 transmits the generated reference response message to the data-generating apparatus as a sender of the reference request.

Note that it is possible to realize the above-described function of processing of each of the data access control apparatus, the data relay apparatus, the data storage server, the data-generating apparatus, and the data-referring apparatus illustrated in the above-described embodiments by a computer. In this case, a program in which content of processing of function to be included in each of the apparatuses is written is provided. By carrying out the program by the computer, the above-described function of processing is realized on the computer. The program in which the content of processing is written can be recorded in a record medium which is capable of being read by the computer. Examples of the record medium which is capable of being read by the computer include a magnetic recording system, an optical disk, a magnetooptical medium, a semiconductor memory or the like. Examples of the magnetic recording system include a hard disk device (HDD), a flexible disk (FD), a magnetic tape. Examples of the optical disk include a DVD, a DVD-RAM, a CD-ROM, a CD-R/RW. Examples of the magnetooptical medium include an MO (Magneto-Optical disc).

In case of distributing programs, for example, portable record mediums, such as DVD, CD-ROM or the like in which the program is recorded are marketed. Further, it is also possible to store the program in a storing device of a server computer, and transfer the program from the server computer to the other computer via a network.

The computer which carries out the program stores, for example, the program which is recorded in the portable record medium, or is transferred from the server computer in the storing device thereof. Then, the computer reads out the program from the storing device thereof, and carries out the processes according to the program. Note that the computer is also capable of directly reading out the program from the portable record medium, and carrying out the processes according to the program. Further, the computer is also capable of carrying out the processes according to the program which is received, each time the program is transferred from the server computer.

According to an embodiment, in the data access control apparatus, the data access control method, and the data access control program, it is possible to reduce the amount of data transferred between a plurality of storage nodes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A data access control apparatus that controls access to data stored in a plurality of storage nodes, comprising:
 a processor configured to perform a procedure comprising:
 determining, when a reference condition and a first reference request are received, whether the reference condition is registered in a management information table;
 transmitting, if the reference condition is not registered in the management information table, the reference condition and the first reference request to all of the plurality of storage nodes;
 determining a first storage node which does not transmit data matching the reference condition in response to the first reference request among the plurality of storage nodes;
 registering identification information of the first storage node in the management information table in association with the reference condition;
 determining, when the reference condition and a second reference request are received after the registering, whether the reference condition is registered in the management information table; and
 transmitting, when determining that the reference condition is registered in the management information table in association with the first storage node, the reference condition and the second reference request to a second storage node different from the first storage node in the plurality of storage nodes.

2. The data access control apparatus according to claim 1, wherein the procedure further includes determining, when a request for storing data is received, a storage node where the data is to be stored, and cancelling, in a case where an identification number of the determined storage node is registered in the management information table, as to the determined storage node, a state in which transmission of a reference request is inhibited.

3. The data access control apparatus according to claim 1, wherein the procedure further comprises:
 determining, when a request for storing data is received, a storage node where the data is to be stored, transmitting a request for storing the data to the determined storage node, determining whether or not a combination of an identification number of the determined storage node and a reference condition are registered in the management information table, temporarily storing, in a case where the combination of the identification number of the determined storage node and the reference condition are registered in the management information table, the data in a storage device, and setting the combination of the identification number of the determined storage node and the reference condition to a cached state; and extracting, when a reference condition and a reference request are received, a combination of the received reference condition and an identification number of a storage node from the management information table, and reading out, in a case where the extracted combination is set to the cached state, the data stored in the storage device, and transmitting the read data to an apparatus as a sender of the reference request.

4. The data access control apparatus according to claim 3, wherein said transmitting data to an apparatus as a sender of a reference request includes extracting, when a reference condition and a reference request are received, a combination of the received reference condition and an identification number of a storage node from the management information table, reading out, in a case where the extracted combination is set to the cached state, the data stored in the storage device, transmitting the read data to an apparatus as a sender of the reference request, and cancelling, as to the extracted combination, a state in which transmission of a reference request is inhibited.

5. The data access control apparatus according to claim 4, wherein said transmitting data to an apparatus as a sender of a reference request includes extracting, when a reference condition and a reference request are received, a combination of the received reference condition and an identification number of a storage node from the management information table, reading out, in a case where the extracted combination is set to the cached state, the data stored in the storage device, transmitting the read data to an apparatus as a sender of the reference request, and deleting the read data from the storage device.

6. The data access control apparatus according to claim 4, wherein said transmitting data to an apparatus as a sender of a reference request includes extracting, when a reference condition and a reference request are received, a combination of the received reference condition and an identification number of a storage node from the management information table, selecting, in a case where the extracted combination is set to the cached state, data stored after a time at which the extracted combination was set to the cached state from the storage device, and transmitting any item of the selected data to the apparatus as a sender of the reference request.

7. The data access control apparatus according to claim 1, wherein said determining the first storage node includes determining, out of response information received from each storage node to which the first reference request has been transmitted, response information in which no data matching the reference condition is stored in a predetermined area, and determining a sender of the determined response information as the first storage node.

8. A data access control method executed by a computer for controlling access to data stored in a plurality of storage nodes, the data access control method comprising:
determining, when a reference condition and a first reference request are received, whether the reference condition is registered in a management information table;
transmitting, if the reference condition is not registered in the management information table, the reference condition and the first reference request to all of the plurality of storage nodes;
determining a first storage node which does not transmit data matching the reference condition in response to the first reference request among the plurality of storage nodes;
registering identification information of the first storage node in the management information table in association with the reference condition;
determining, when the reference condition and a second reference request are received after the registering, whether the reference condition is registered in the management information table; and
transmitting, when determining that the reference condition is registered in the management information table in association with the first storage node, the reference condition and the second reference request to a second storage node different from the first storage node in the plurality of storage nodes.

9. The data access control method according to claim 8, further comprising determining, when a request for storing data is received, a storage node where the data is to be stored, and cancelling, in a case where an identification number of the determined storage node is registered in the management information table, as to the determined storage node, a state in which transmission of a reference request is inhibited.

10. The data access control method according to claim 8, further comprising:
determining, when a request for storing data is received, a storage node where the data is to be stored, transmitting a request for storing the data to the determined storage node, determining whether or not a combination of an identification number of the determined storage node and a reference condition are registered in the management information table, temporarily storing, in a case where the combination of the identification number of the determined storage node and the reference condition are registered in the management information table, the data in a storage device, and setting the combination of the identification number of the determined storage node and the reference condition to a cached state; and
extracting, when a reference condition and a reference request are received, a combination of the received reference condition and an identification number of a storage node from the management information table, and reading out, in a case where the extracted combination is set to the cached state, the data stored in the storage device, and transmitting the read data to an apparatus as a sender of the reference request.

11. The data access control method according to claim 10, wherein said transmitting data to an apparatus as a sender of a reference request includes extracting, when a reference condition and a reference request are received, a combination of the received reference condition and an identification number of a storage node from the management information table, reading out, in a case where the extracted combination is set to the cached state, the data stored in the storage device, transmitting the read data to an apparatus as a sender of the reference request, and cancelling, as to the extracted combination, a state in which transmission of a reference request is inhibited.

12. The data access control method according to claim 11, wherein said transmitting data to an apparatus as a sender of a reference request includes extracting, when a reference condition and a reference request are received, a combination of the received reference condition and an identification number of a storage node from the management information table, reading out, in a case where the extracted combination is set to the cached state, the data stored in the storage device, transmitting the read data to an apparatus as a sender of the reference request, and deleting the read data from the storage device.

13. The data access control method according to claim 11, wherein said transmitting data to an apparatus as a sender of a reference request includes extracting, when a reference condition and a reference request are received, a combination of the received reference condition and an identification number of a storage node from the management information table, selecting, in a case where the extracted combination is set to the cached state, data stored after a time at which the extracted combination was set to the cached state from the storage device, and transmitting any item of the selected data to the apparatus as a sender of the reference request.

14. The data access control method according to claim 8, wherein said determining the first storage node includes determining, out of response information received from each storage node to which the first reference request has been transmitted, response information in which no data matching the reference condition is stored in a predetermined area, and determining a sender of the determined response information as the first storage node.

15. A non-transitory computer-readable storage medium storing a computer program for controlling access to data stored in a plurality of storage nodes, the computer program causing a computer to perform a procedure comprising:
  determining, when a reference condition and a first reference request are received, whether the reference condition is registered in a management information table;
  transmitting, if the reference condition is not registered in the management information table, the reference condition and the first reference request to all of the plurality of storage nodes;
  determining a first storage node which does not transmit data matching the reference condition in response to the first reference request among the plurality of storage nodes;
  registering identification information of the first storage node in the management information table in association with the reference condition;
  determining, when the reference condition and a second reference request are received after the registering, whether the reference condition is registered in the management information table; and
  transmitting, when determining that the reference condition is registered in the management information table in association with the first storage node, the reference condition and the second reference request to a second storage node different from the first storage node in the plurality of storage nodes.

16. The non-transitory computer-readable storage medium according to claim 15, wherein the procedure further comprises determining, when a request for storing data is received, a storage node where the data is to be stored, and cancelling, in a case where an identification number of the determined storage node is registered in the management information table, as to the determined storage node, a state in which transmission of a reference request is inhibited.

17. The non-transitory computer-readable storage medium according to claim 15, wherein the procedure further comprises:
  determining, when a request for storing data is received, a storage node where the data is to be stored, transmitting a request for storing the data to the determined storage node, determining whether or not a combination of an identification number of the determined storage node and a reference condition are registered in the management information table, temporarily storing, in a case where the combination of the identification number of the determined storage node and the reference condition are registered in the management information table, the data in a storage device, and setting the combination of the identification number of the determined storage node and the reference condition to a cached state; and
  extracting, when a reference condition and a reference request are received, a combination of the received reference condition and an identification number of a storage node from the management information table, and reading out, in a case where the extracted combination is set to the cached state, the data stored in the storage device, and transmitting the read data to an apparatus as a sender of the reference request.

18. The non-transitory computer-readable storage medium according to claim 17, wherein said transmitting data to an apparatus as a sender of a reference request includes extracting, when a reference condition and a reference request are received, a combination of the received reference condition and an identification number of a storage node from the management information table, reading out, in a case where the extracted combination is set to the cached state, the data stored in the storage device, transmitting the read data to an apparatus as a sender of the reference request, and cancelling, as to the extracted combination, a state in which transmission of a reference request is inhibited.

19. The non-transitory computer-readable storage medium according to claim 18, wherein said transmitting data to an apparatus as a sender of a reference request includes extracting, when a reference condition and a reference request are received, a combination of the received reference condition and an identification number of a storage node from the management information table, reading out, in a case where the extracted combination is set to the cached state, the data stored in the storage device, transmitting the read data to an apparatus as a sender of the reference request, and deleting the read data from the storage device.

20. The non-transitory computer-readable storage medium according to claim 15, wherein said determining the first storage node includes determining, out of response information received from each storage node to which the first reference request has been transmitted, response information in which no data matching the reference condition is stored in a predetermined area, and determining a sender of the determined response information as the first storage node.

* * * * *